(12) United States Patent
Sawada

(10) Patent No.: US 7,627,539 B2
(45) Date of Patent: Dec. 1, 2009

(54) LEARNING APPARATUS AND METHOD

(75) Inventor: Tsutomu Sawada, Tokyo (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 11/787,548

(22) Filed: Apr. 17, 2007

(65) Prior Publication Data
US 2007/0250463 A1    Oct. 25, 2007

Related U.S. Application Data

(63) Continuation-in-part of application No. 11/589,638, filed on Oct. 30, 2006.

(51) Int. Cl.
*G06N 3/12* (2006.01)
(52) U.S. Cl. ...................................................... 706/13
(58) Field of Classification Search ................. 706/1–8, 706/12, 14, 15, 26, 33, 34, 41, 45, 46, 50, 706/13; 700/1, 28, 48; 707/3, 5; 701/50; 435/6; 382/104
See application file for complete search history.

(56) References Cited

U.S. PATENT DOCUMENTS

| 6,549,752 | B2 * | 4/2003 | Tsukamoto | 434/362 |
| 7,117,185 | B1 * | 10/2006 | Aliferis et al. | 706/12 |
| 7,324,981 | B2 * | 1/2008 | Chickering | 706/45 |
| 7,346,593 | B2 * | 3/2008 | Takeuchi et al. | 706/12 |
| 2006/0100872 | A1 * | 5/2006 | Yokoi | 704/256 |
| 2006/0224535 | A1 * | 10/2006 | Chickering et al. | 706/16 |

OTHER PUBLICATIONS

Melanie Mitchell, An Introduction to Genetic Algorithms, 1996, MIT Press, Chap. 1-6.*
Hiroaki Kitano, Designing Neural Networks using Genetic Algorithms with Graph Generation, Complex Systems Journal, vol. 4 (1990), pp. 461-476.*

* cited by examiner

*Primary Examiner*—David R Vincent
*Assistant Examiner*—Ola Olude-Afolabi
(74) *Attorney, Agent, or Firm*—Frommer Lawrence & Haug LLP; William S. Frommer; Thomas F. Presson

(57) ABSTRACT

A learning apparatus for building a network structure of a Bayesian network based on learning data. In the Bayesian network, a cause and effect relationship between plural nodes is represented by a directed graph. The learning apparatus includes storage means in which the learning data is stored; and learning means for building the network structure based on the learning data. The learning means prepares an initial population of individuals constituted by individuals each having a genotype in which orders between the nodes and cause and effect relationship have been stipulated, repeatedly performs processing for crossovers and/or mutations on the initial population of individuals based on a genetic algorithm, calculates an evaluated value of each of the individuals based on the learning data, searches for an optimum one of the individuals, and takes a phenotype of the optimum individual as the network structure.

10 Claims, 28 Drawing Sheets

| Case | $X_0$ | $X_1$ | $X_2$ | $X_3$ | $X_4$ |
|---|---|---|---|---|---|
| 1 | $X_0^{10}$ | $X_1^{10}$ | $X_2^{12}$ | $X_3^{10}$ | $X_4^{10}$ |
| 2 | $X_0^{21}$ | $X_1^{21}$ | $X_2^{22}$ | $X_3^{21}$ | $X_4^{22}$ |
| 3 | $X_0^{30}$ | $X_1^{30}$ | $X_2^{30}$ | $X_3^{32}$ | $X_4^{30}$ |
| ... | ... | ... | ... | ... | ... |
| N | $X_0^{N3}$ | $X_1^{N0}$ | $X_2^{N1}$ | $X_3^{N1}$ | $X_4^{N0}$ |

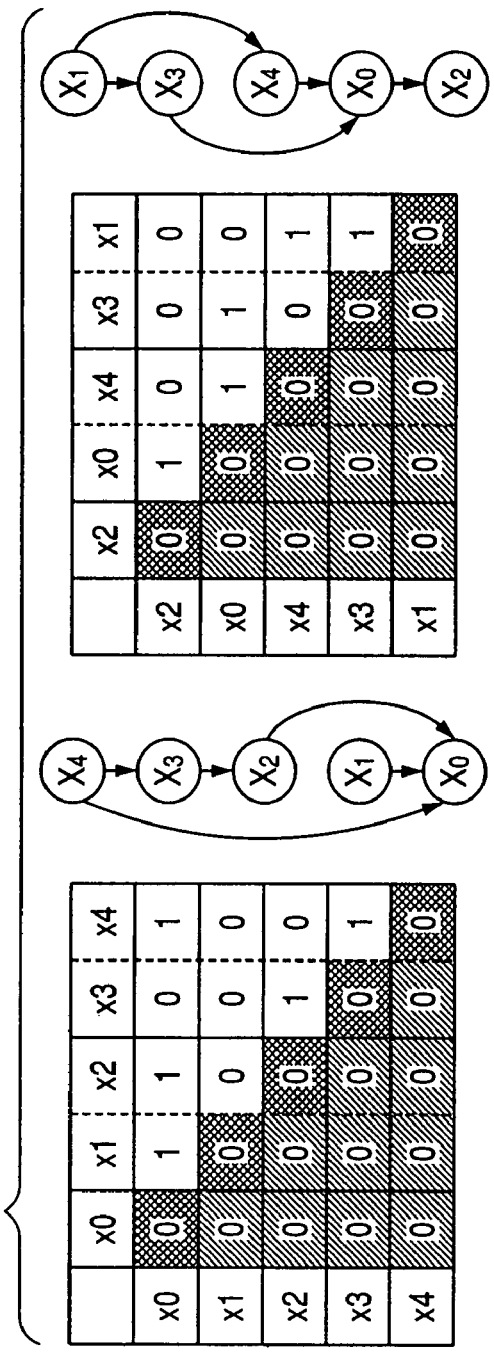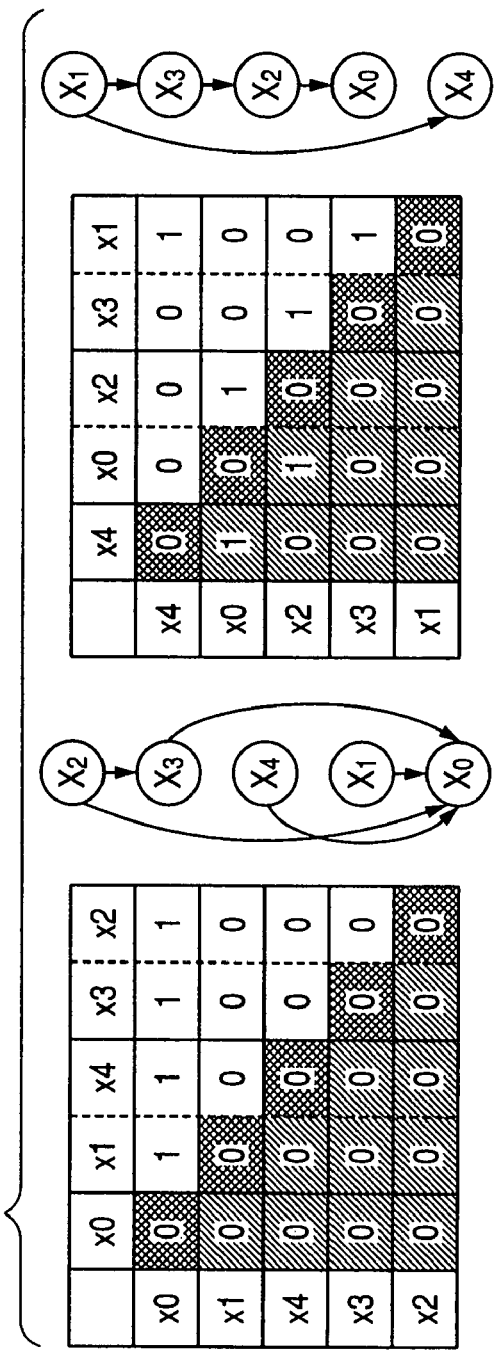
FIG. 8A
FIG. 8B

|    | x0 | x1 | x2 | x3 | x4 |
|----|----|----|----|----|----|
| x0 | 0  | 1  | 1  | 0  | 1  |
| x1 | 0  | 0  | 0  | 0  | 0  |
| x2 | 0  | 0  | 0  | 1  | 0  |
| x3 | 0  | 0  | 0  | 0  | 1  |
| x4 | 0  | 0  | 0  | 0  | 0  |

|    | x0 | x1 | x2 | x3 | x4 |
|----|----|----|----|----|----|
| x0 | 0  | 1  | 1  | 0  | 0  |
| x1 | 0  | 0  | 0  | 1  | 0  |
| x2 | 0  | 0  | 0  | 1  | 0  |
| x3 | 0  | 0  | 0  | 0  | 1  |
| x4 | 0  | 0  | 0  | 0  | 0  |

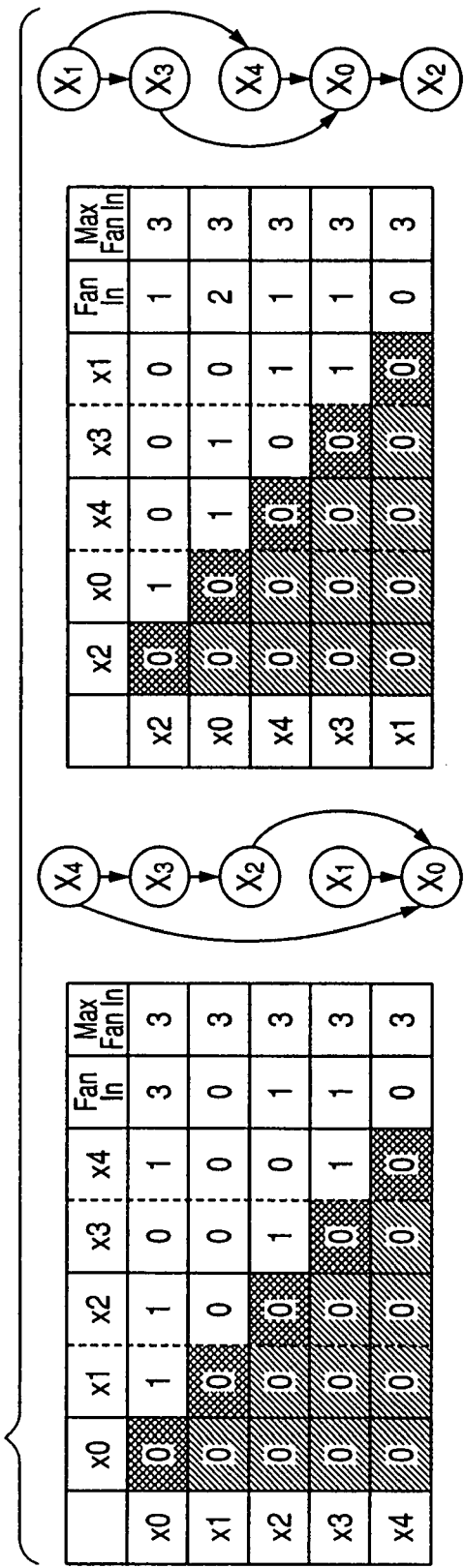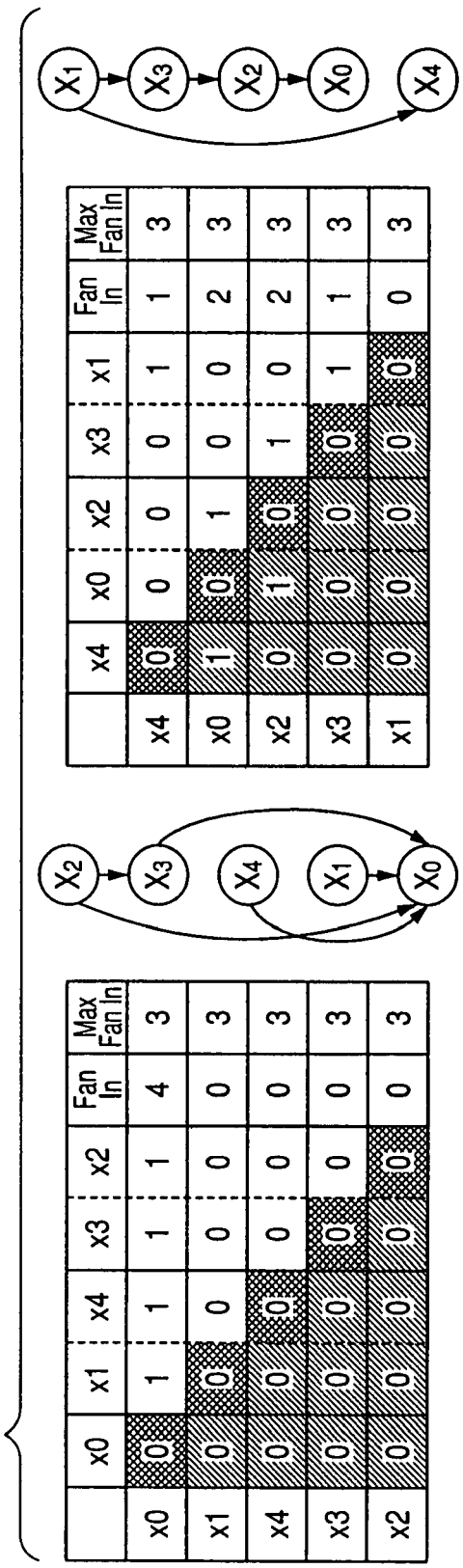
FIG. 12A
FIG. 12B

| | x0 | x1 | x4 | x3 | x2 | Fan In | Max Fan In |
|---|---|---|---|---|---|---|---|
| x0 | 0 | 1 | 1 | 1 | 1 | 4 | 3 |
| x1 | 0 | 0 | 0 | 0 | 0 | 0 | 3 |
| x4 | 0 | 0 | 0 | 0 | 0 | 0 | 3 |
| x3 | 0 | 0 | 0 | 0 | 0 | 0 | 3 |
| x2 | 0 | 0 | 0 | 0 | 0 | 0 | 3 |

| | x0 | x1 | x4 | x3 | x2 | Fan In | Max Fan In |
|---|---|---|---|---|---|---|---|
| x0 | 0 | 1 | 1 | 0 | 1 | 3 | 3 |
| x1 | 0 | 0 | 0 | 0 | 0 | 0 | 3 |
| x4 | 0 | 0 | 0 | 0 | 0 | 0 | 3 |
| x3 | 0 | 0 | 0 | 0 | 0 | 0 | 3 |
| x2 | 0 | 0 | 0 | 0 | 0 | 0 | 3 |

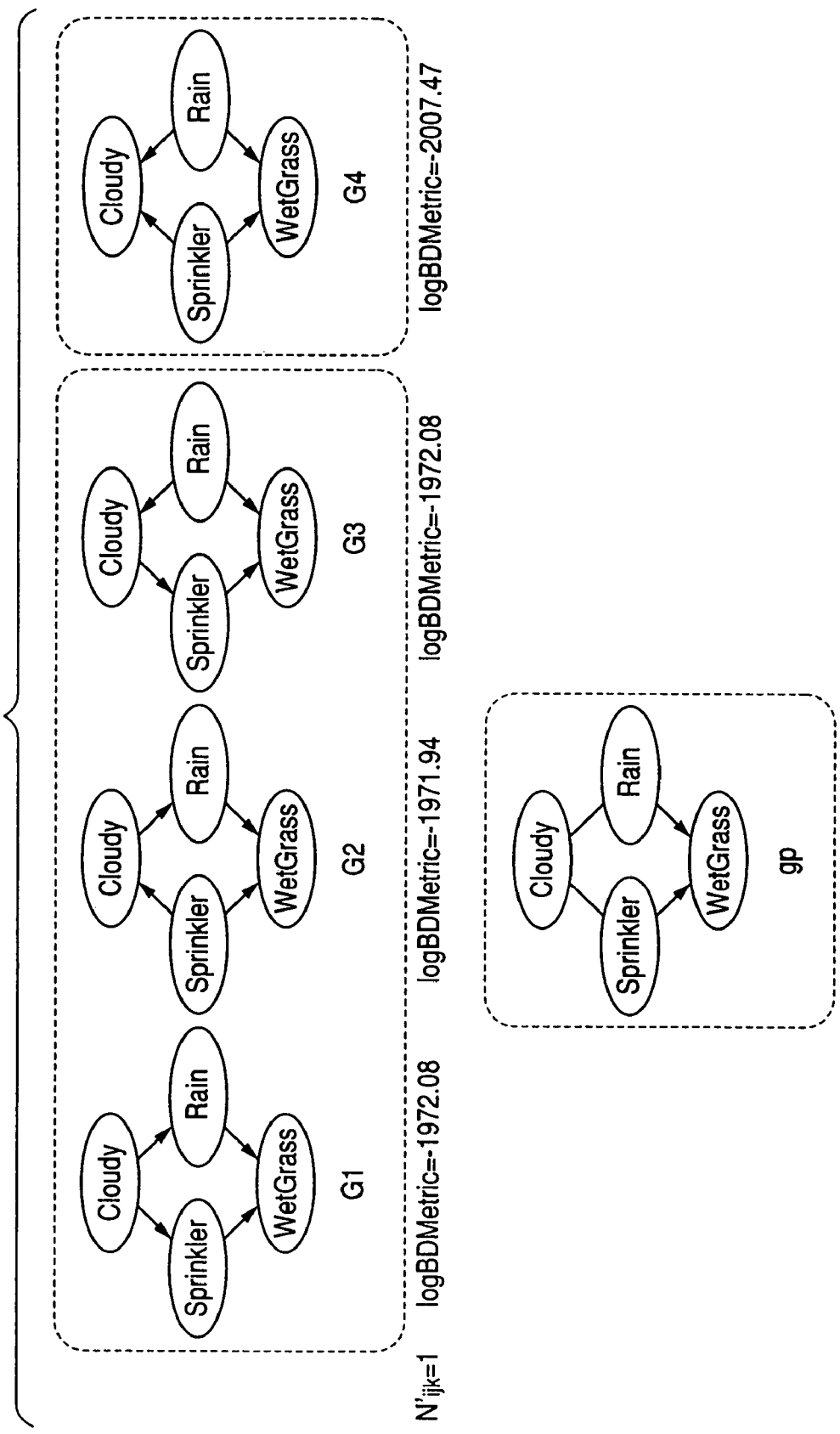

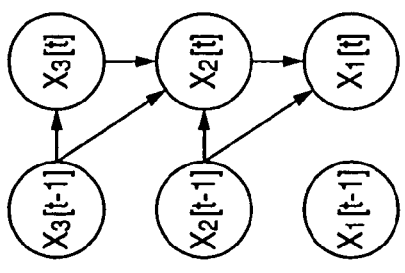
FIG. 27B
FIG. 27A
FIG. 27C
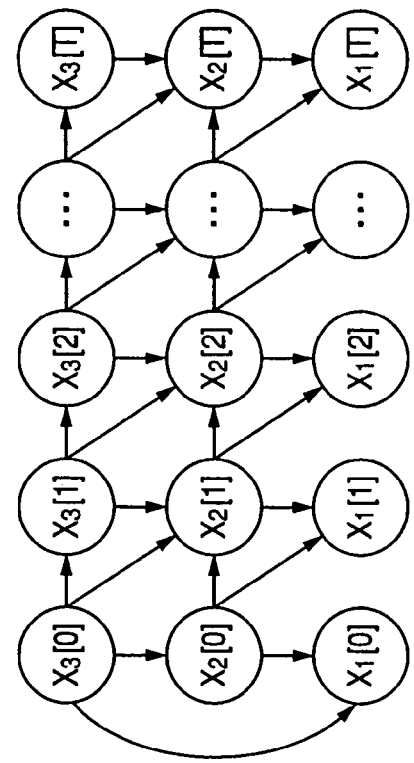
FIG. 27D
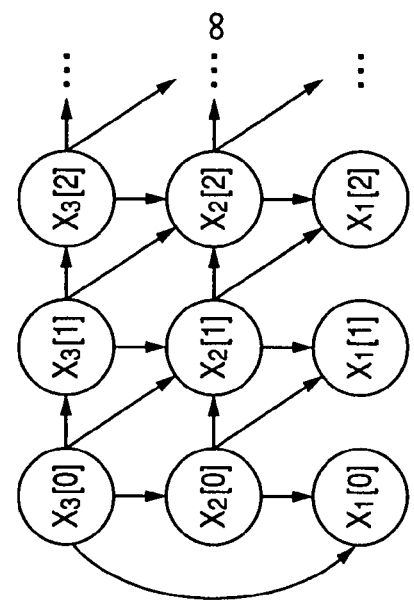

FIG. 28B

| From | $X_1$ | $X_2$ | $X_3$ |
|---|---|---|---|
| t | | | |
| | 0 | 1 | 0 |
| | 0 | 0 | 1 |
| | 0 | 0 | 0 |
| To | $X_1$ | $X_2$ | $X_3$ |

| t-1 | $X_1$ | $X_2$ | $X_3$ |
|---|---|---|---|
| | 0 | 1 | 0 |
| | 0 | 1 | 1 |
| | 0 | 0 | 1 |
| t-1 to t | $X_1$ | $X_2$ | $X_3$ |
| t | | | |

FIG. 28A

| From | $X_1$ | $X_2$ | $X_3$ |
|---|---|---|---|
| t=0 | | | |
| | 0 | 1 | 1 |
| | 0 | 0 | 1 |
| | 0 | 0 | 0 |
| To | $X_1$ | $X_2$ | $X_3$ |

LEARNING APPARATUS AND METHOD

CROSS REFERENCE TO RELATED APPLICATION

This application is a continuation-in-part of U.S. patent application Ser. No. 11/589,638, filed on Oct. 30, 2006. The present invention contains subject matter related to Japanese Patent Applications JP2005-317031, JP2006-116038 and JP2006-236199 filed in the Japanese Patent Office on Oct. 31, 2005, Apr. 19, 2006 and Aug. 31, 2006, respectively, the entire contents of which being incorporated herein by reference.

BACKGROUND OF THE INVENTION

1. Field of the Invention

The present invention relates to a learning apparatus for building a network structure of a Bayesian network based on data obtained by learning (hereinafter may be referred to as "learning data") and to a method of building the network structure.

2. Description of the Related Art

In recent years, the scope of application of the information processing technology has been extended, and an information-processing mechanism capable of operating according to various circumstances and a variety of users has become important. That is, treated objects having uncertainty (i.e., objects which may not be assumed in advance or may not be fully observed) have become increasingly important. Therefore, a mechanism of processing intelligent information to understand circumstances as precisely as possible even if only uncertain information is available and of performing appropriate processing may be required.

Because of these demands, a probability model which describes an object of interest using a network structure and probabilistically forecasts from observed events the object to be known has attracted attention. A Bayesian network which indicates a cause and effect relationship (connection) between nodes representing variables by means of a directed graph is known as a typical probability model.

[Non-patent reference 1] Cooper, G., and Herskovits, E., "A Bayesian method for the induction of probabilistic networks from Data", Machine Learning, Vol. 9, pp. 309-347, 1992

[Non-patent reference 2] Hongjun Zhou, Shigeyuki Sakane, "Sensor Planning for Mobile Robot Localization Using Structure Learning and Inference of Bayesian Network," Journal of the Japan Robotics Society, Vol. 22, No. 2, pp. 245-255, 2004

SUMMARY OF THE INVENTION

In order to apply the Bayesian network to an actual object to be handled, it is important to build an appropriate model.

In many of existing examples of practical applications, a model is built by making use of knowledge and experience of an expert who is versed in the region to be tackled. There is a demand for a method of building a network structure of a Bayesian network based on learning data. However, building a network structure based on learning data is an NP-hard problem. Furthermore, it may be necessary that directed acyclicity of the network structure be assured. Therefore, it is not easy to build an optimum network structure.

Accordingly, in order to build a network structure in a realistic time, a K2 algorithm using heuristics has been proposed (see non-patent reference 1). The K2 algorithm includes the steps: 1) restricted candidates that can be parent nodes for each node are selected; 2) one child node is selected, candidate parent nodes are added one by one, and a network structure is built; 3) the node is adopted as a parent node if and only if the evaluated value goes high; and 4) the process goes to other child node if there is not any other node that can be added as a parent node or if the evaluated value is not increased by addition of a node. The above-described steps 1)-4) are carried out for every child node. Thus, a quasi-optimum network structure can be built. In the step 1) above, candidates that can become parent nodes for each node are restricted for the following reasons. Where the orders between nodes are previously designed, the range in which a search for a network structure is made is restricted, thus reducing the amount of computation. Furthermore, the acyclicity of the network structure is assured.

Although this K2 algorithm can build a network structure in a realistic time, there is the restriction that the orders between nodes might be previously designed based on designer's prior knowledge.

On the other hand, a method of determining the connection between nodes using a K2 algorithm after determining the orders between the nodes using a genetic algorithm has also been proposed (see non-patent reference 2).

However, with these related art algorithms, a network structure is built by determining the connection between nodes in a bottom-up manner according to orders designed by a designer or according to orders determined using a genetic algorithm. Therefore, these algorithms are unsuited for added learning of network structures. In addition, many people have some knowledge about connection besides experts versed in the region to be handled. With related art algorithms, it has been difficult to reflect prior knowledge about connection in a network structure.

In view of such actual circumstances in the related art techniques, it is desirable to provide learning apparatus and method which can build a network structure (i.e., orders and connections) of a Bayesian network based on learning data when there is an NP-hard problem, can reflect all or some of knowledge about orders and connections in the network structure, and permit added learning of the network structure.

A learning apparatus according to one embodiment of the present invention builds a network structure of a Bayesian network based on learning data, the Bayesian network representing a cause and effect relationship between plural nodes in terms of a directed graph. The learning apparatus has (a) storage means in which the learning data is stored and (b) learning means for building the network structure based on the learning data. The learning means prepares an initial population of individuals constituted by individuals each having a genotype in which orders between the nodes and cause and effect relationship have been stipulated, repeatedly carries out crossovers and/or mutations on the initial population of individuals based on a genetic algorithm, calculates an evaluated value for each individual based on the learning data, searches for an optimum individual, and takes the phenotype of the optimum individual as the aforementioned network structure.

In the learning apparatus according to the embodiment described above, the genotype can take the plural nodes arranged in a first direction according to a stipulated order as parent nodes, take the plural nodes arranged in a second direction perpendicular to the first direction according to the stipulated order as child nodes, and stipulate the presence or absence of a cause and effect relationship between corresponding nodes by alleles at each of gene loci at which the parent nodes and child nodes correspond to each other.

Another embodiment of the present invention is a learning method of building a network structure of a Bayesian network where a cause and effect relationship between plural nodes is represented by a directed graph. This method starts with preparing an initial population of individuals constituted by individuals each having a genotype in which orders and a cause and effect relationship between the nodes are stipulated. Crossovers and/or mutations of the initial population of individuals are repeatedly performed based on a genetic algorithm. An evaluated value for each individual is calculated based on the learning data, and an optimum individual is searched for. The phenotype of the optimum individual is taken as the aforementioned network structure.

According to the learning apparatus and method according to embodiments of the present invention, a quasi-optimum network structure can be efficiently built when there is an NP-hard problem. Furthermore, all or some of designer's knowledge about the network structure (orders and connections) can be reflected in the initial population of individuals. Moreover, added learning of the network structure is enabled.

BRIEF DESCRIPTION OF THE DRAWINGS

FIGS. 8A and 8B are diagrams showing examples of order crossovers in a case where the orders of parent individuals are different.

FIGS. 12A and 12B are diagrams showing examples in which the number of parent nodes having a cause and effect relationship with some child node exceeds an upper limit as a result of processing for order crossovers.

FIG. 14 is a diagram showing four directed acyclic graphs and an evaluated value calculated under the condition $N'_{ijk}=1$.

FIGS. 27A-27D are diagrams showing examples of phenotypes in 2TBN.

FIGS. 28A and 28B are diagrams showing examples of two-dimensional genotypes in 2TBN.

DESCRIPTION OF THE PREFERRED EMBODIMENTS

Specific embodiments of the present invention are hereinafter described in detail with reference to the drawings. In one of the embodiments, the invention is applied to a learning apparatus which constructs a network structure of a Bayesian network based on data about learning (learning data).

Figures 1, 2:
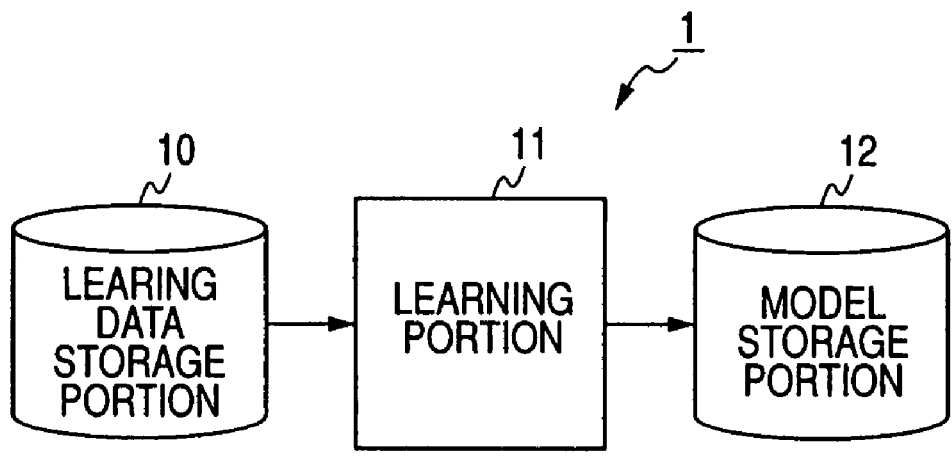
FIG. 1 is a schematic diagram of a learning apparatus according to an embodiment of the present invention.
FIG. 2 is a table showing an example of a set of items of learning data used when a model of a Bayesian network is built.

First, the structure of the learning apparatus according to the present embodiment is schematically shown in FIG. 1. As shown in FIG. 1, the learning apparatus 1 according to the present embodiment includes a learning data storage portion 10, a learning portion 11, and a model storage portion 12.

Learning data used when a model of a Bayesian network is built is stored in the learning data storage portion 10. One example of full set of discrete data in a case where there are five nodes, from $X_0$ to $X_4$, is shown in FIG. 2. In FIG. 2, each item of the learning data is represented in the form $X_i^{jk}$, where i indicates a node ID, j indicates a case ID (i.e., what is the data item number as counted from the first obtained item of the learning data), and k indicates a state ID (i.e., the state at each node). That is, $X_i^{jk}$ means that the state of learning data item obtained at the node $X_i$ as the jth data item is indicated by state ID=k.

The learning portion 11 builds a model of a Bayesian network based on the learning data stored in the learning data storage portion 10. Especially, the learning portion 11 determines both the orders between nodes constituting the network structure of the Bayesian network and connections at the same time by the use of a genetic algorithm. The use of the genetic algorithm makes it possible to build a quasi-optimum network structure efficiently when there is an NP-hard problem. The model built by the learning portion 11 is stored in the model storage portion 12.

Processing for building the network structure by the learning portion 11 is next described in detail. In the following, it is assumed, for the sake of simplicity, that there are five nodes, from $X_0$ to $X_4$.

Figures 3A, 3B:
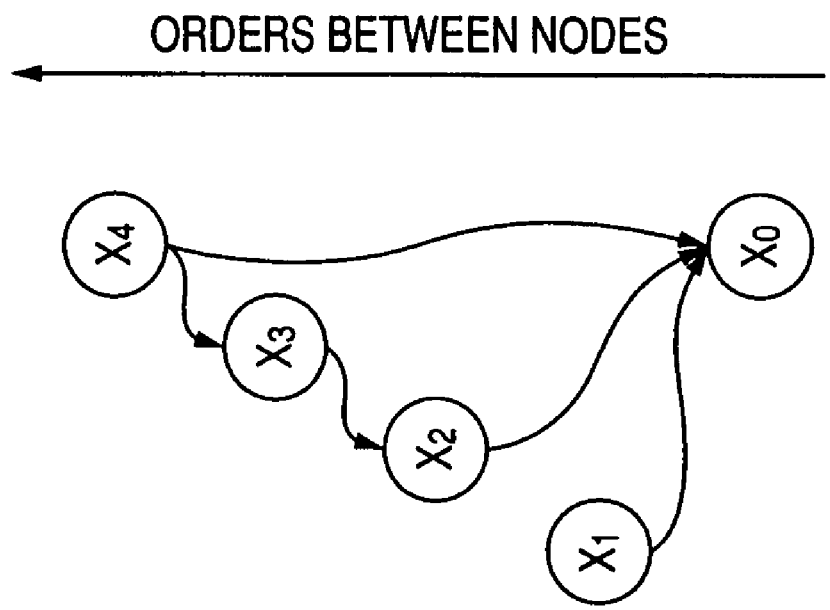
FIGS. 3A and 3B are diagrams showing an example of a two-dimensional genotype and its phenotype.

The learning portion 11 according to the present embodiment represents individuals used in the network structure of the Bayesian network, i.e., genetic algorithm, in terms of a two-dimensional genotype as shown in FIG. 3A. In FIG. 3A, $x_0$, $x_1$, $x_2$, $x_3$, and $x_4$ in the rows and columns indicate the orders between nodes. The orders in the rows and columns are identical at all times. Gene loci in the triangular region located over the diagonal components have alleles "1" and "1", which indicate connections from parent nodes to child nodes. "0" indicates that there is no cause and effect relationship between parent and child nodes. "1" indicates that there is a cause and effect relationship between parent and child nodes. Each diagonal component corresponds to a self-loop. Gene loci in the triangular region located under the diagonal components have alleles "0" and "1", which indicate connections from child nodes to parent nodes. To assure acyclicity of the network structure, it is assumed that genes located under the diagonal components show no manifestation of traits. Therefore, individual shaving the two-dimensional genotype as shown in FIG. 3A have a phenotype as shown in FIG. 3B.

The learning portion 11 takes numerous individuals having such a two-dimensional genotype as an initial population of individuals. The initial population of individuals is searched for an optimum individual using a genetic algorithm. The phenotype of the individual is taken as a quasi-optimum network structure.

Figure 4:
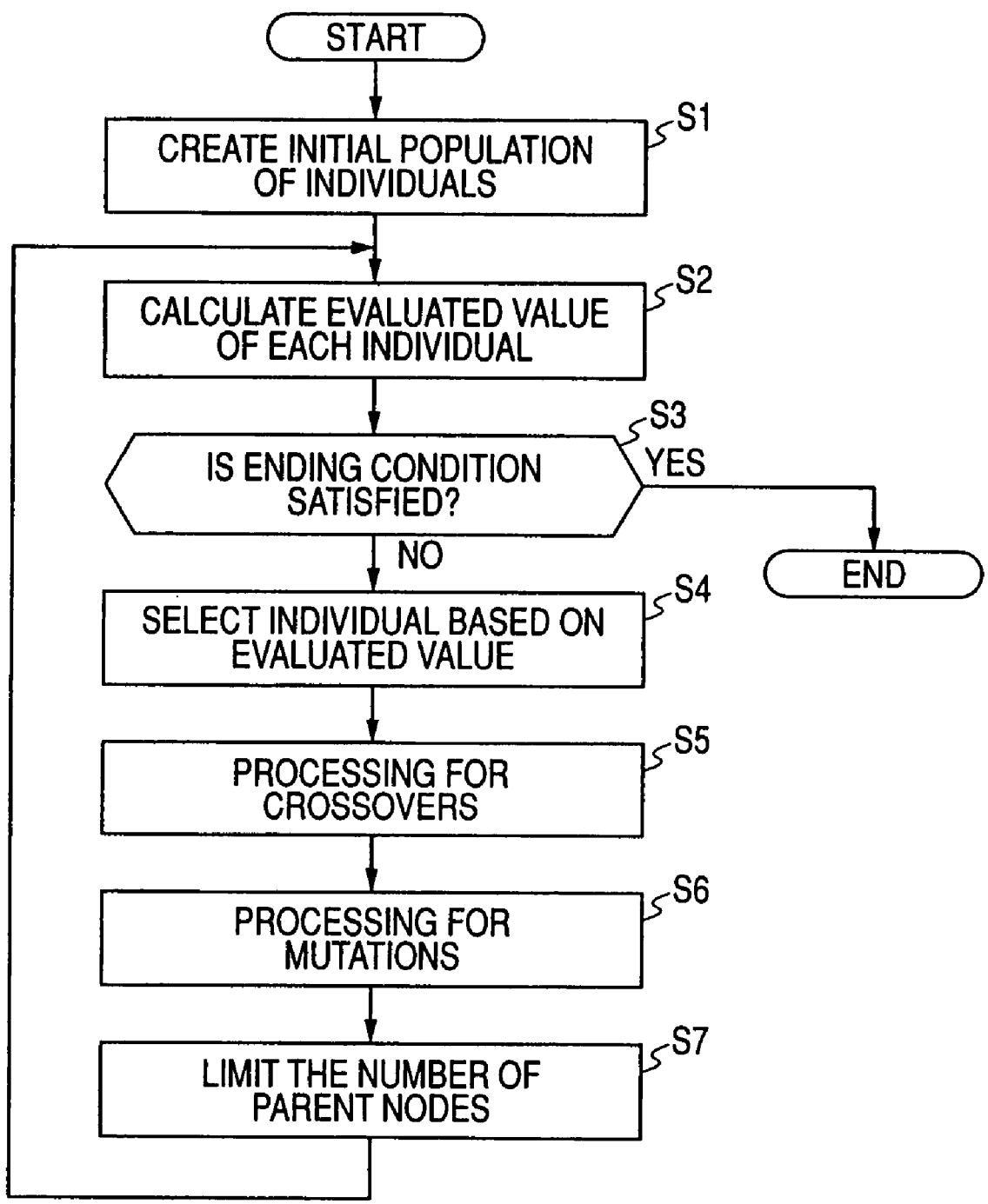
FIG. 4 is a flowchart illustrating a procedure for searching for an optimum individual using a genetic algorithm.

A procedure for searching for the optimum individual using the genetic algorithm is illustrated in the flowchart of FIG. 4.

First, in step S1, the learning portion 11 creates the initial population of individuals. At this time, the learning portion 11 may create the initial population of individuals at random. Where the designer has knowledge about the network structure (orders and connections), the initial population of individuals may be created by converting the phenotypes into two-dimensional genotypes and performing processing for mutations. The latter method permits the designer's knowledge about the network structure to be totally or partially reflected in the initial population of individuals. Furthermore, the learning portion 11 may create the initial population of individuals from individuals indicated by the results of learning. In this case, added learning of the network structure is enabled.

Then, in step S2, the learning portion 11 calculates the evaluated value of each individual (fitness in the genetic algorithm) based on the learning data stored in the learning data storage portion 10. In particular, the BD metric ($P(D|B_s)$) is calculated according to the following Eq. (1), and a logarithm of the calculated value is taken as the evaluated value.

$$P(D|B_s) = \prod_{i=0}^{n-1} \prod_{j=0}^{q_i-1} \frac{\Gamma(N'_{ij})}{\Gamma(N'_{ij} + N_{ij})} \prod_{k=0}^{r_i-1} \frac{\Gamma(N'_{ijk} + N_{ijk})}{\Gamma(N'_{ijk})} \quad (1)$$

Figure 5A:
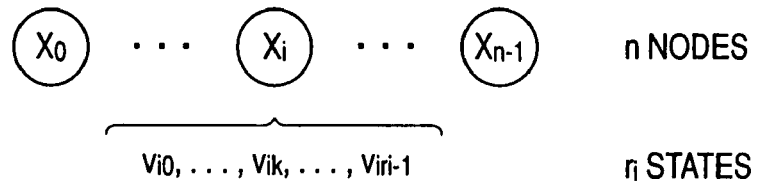
FIGS. 5A and 5B are diagrams illustrating a calculational formula for BD metric.
Figure 5B:
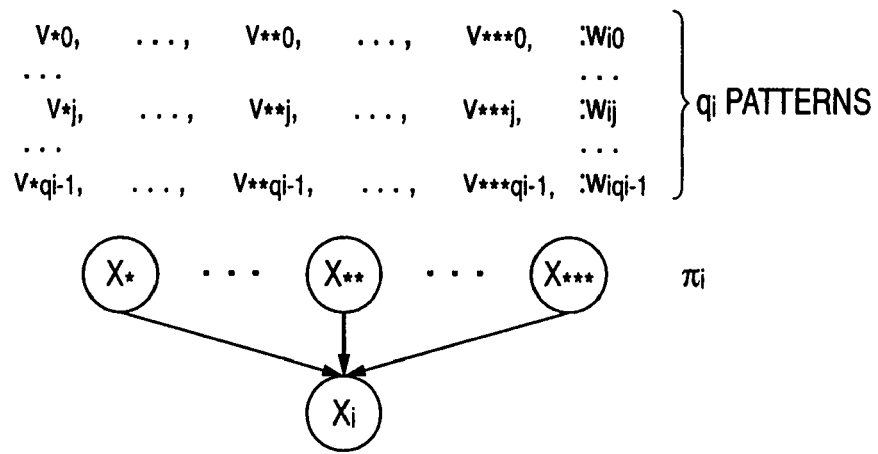

In this Eq. (1), D is learning data stored in the learning data storage portion 10, $B_s$ indicates individuals used in the network structure of the Bayesian network, i.e., genetic algorithm, $P(D|B_s)$ is the probability of D under condition $B_s$, and $\Gamma$ is a gamma function and given by $\Gamma(n)=(n-1)!$. From $(n-1)!=n!/n$, it is considered that $0!=1!/1=1$. Therefore, for the sake of convenience, the relationship $0!=1$ is introduced. Furthermore, as shown in FIG. 5A, let n be the number of nodes. Let $X_i$ be the ith node. Let $v_{ik}$ be the kth value that the $X_i$ can assume. Let $r_i$ be the number of values (number of states) that the $X_i$ can assume. As shown in FIG. 5B, let $\Pi_i$ be the parent node pattern of the $X_i$. Let $w_{ij}$ be the jth pattern (value that can be assumed) of the $\Pi_i$. $q_i$ is the number of patterns of the $\Pi_i$. $N_{ijk}$ is the number of data items within the learning data D which make $X_i$ have values $v_{ik}$ and $\Pi_i$ have values $w_{ij}$. $N_{ij}$ is calculated according to the following Eq. (2). $N'_{ijk}$ and $N'_{ij}$ are associated with designer's prior knowledge and can be treated similarly to $N_{ijk}$ and $N_{ij}$. Their details will be described later.

$$N_{ij} = \sum_{k=0}^{r_i-1} N_{ijk} \quad (2)$$

In practice, the learning data stored in the learning data storage portion 10 may have missing data items or may be continuous quantity instead of discrete data. A method of coping with missing data items or continuous quantity is described, for example, by Richard E. Neapolitan in "LEARNING BAYESIAN NETWORKS", ISBN 0-13-012534-2.

Subsequently, in step S3, the learning portion 11 makes a decision as to whether an ending condition is satisfied or not. In particular, one example of the ending condition is that the number of generations has exceeded a threshold value. Another example is that the rate of variation of the evaluated value has decreased below a threshold value. If the ending condition is not satisfied, control goes to step S4. If the ending condition is satisfied, an individual producing the highest evaluated value is selected, and the processing is ended.

Subsequently, in step S4, the learning portion 11 selects a next population of individuals from the present population of individuals based on the evaluated value. That is, the learning portion selects a desired number of individuals from the present population of individuals based on the evaluated value while permitting overlap. Methods generally used in genetic algorithms such as roulette wheel selection, tournament selection, and elite reservation can be used as methods of selection. However, the logarithm of the BD metric that is an evaluated value is a negative value and so it is difficult to directly utilize a method of performing a selection with a probability proportional to the evaluated value as in roulette wheel selection. Accordingly, the evaluated value may be previously converted into a positive value using a Boltzmann distribution.

Subsequently, in steps S5 and S6, the learning portion 11 performs processing for crossovers on individuals contained in the present population of individuals according to a desired crossover probability. Furthermore, the learning portion performs processing for mutations according to a desired mutation rate. In this processing for crossovers, two child individuals are created from two parent individuals. In the processing for mutations, one child individual is created from one parent individual. At this time, parent individuals may be replaced by created child individuals. Child individuals and parent individuals may be made to coexist.

Figure 6A:
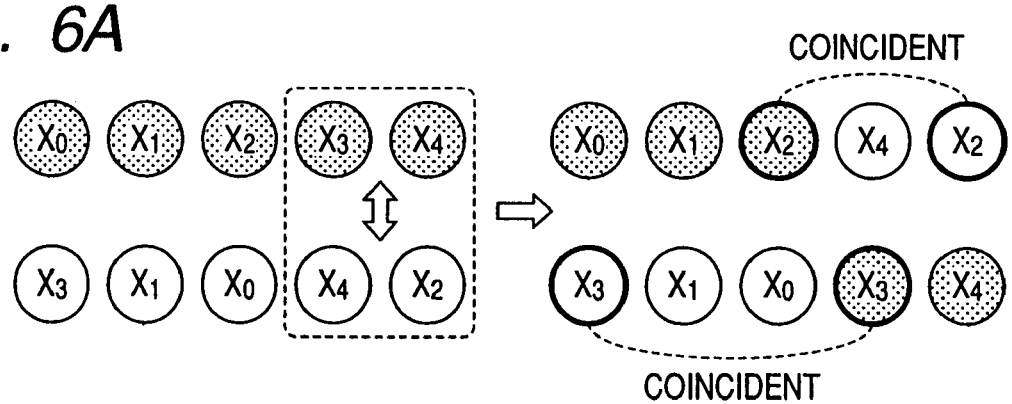
FIGS. 6A and 6B are diagrams showing an example of a lethal gene produced during order crossovers and order mutations in a classical genetic algorithm.
Figure 6B:
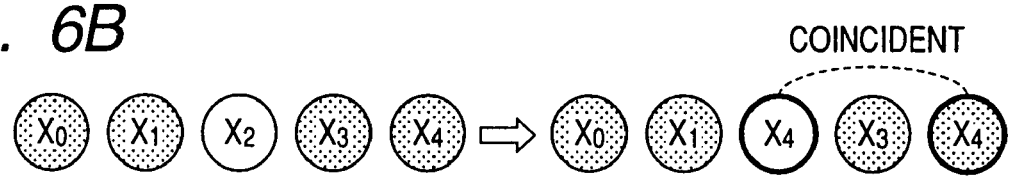

Especially, in the processing for order crossovers and processing for order mutations, in a case where a classical procedure of genetic algorithm is used, lethal genes are easily produced as shown in FIGS. 6A and 6B. For example, as shown in FIG. 6A, where individuals having orders $X_0$, $X_1$, $X_2$, $X_3$, and $X_4$ and individuals having orders $X_3$, $X_1$, $X_0$, $X_4$, and $X_2$ are crossed using the point between the third and fourth nodes as a crossover point, it follows that nodes having the same node ID are present within the same individual, resulting in a lethal gene. Furthermore, as shown in FIG. 6B, where processing for producing mutations at the position $X_2$ of individuals having orders $X_0$, $X_1$, $X_2$, $X_3$, and $X_4$ is performed to produce $X_4$, it follows that nodes having the same node ID are present within the same individual. This gives rise to a lethal gene. Where lethal genes a reproduced easily in this way, the efficiency of learning is low. Therefore, a framework preventing generation of lethal genes would be necessary.

When a network structure of a Bayesian network is built using a genetic algorithm, order crossover or order mutation is essentially equivalent to a traveling salesman problem, and various procedures have been proposed (see, literature written by P. Larranaga, C. Kuijpers, R. Murga, and Y. Yurramendi, "Learning Bayesian network structures by searching for the best ordering with genetic algorithms", IEEE Transactions on Systems, Man and Cybernetics, 26(4), pp. 487-493, 1996)

In the following, processing for crossovers in step S5 is first described while taking specific examples.

Figure 7A:
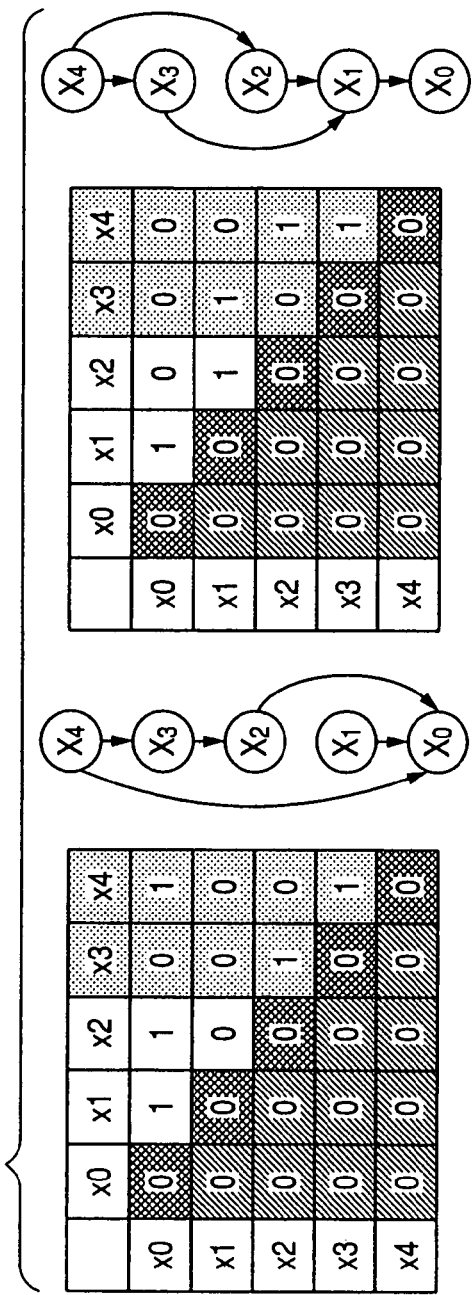
FIGS. 7A and 7B are diagrams showing examples of connection crossovers in a case where the orders of parent individuals are the same.
Figure 7B:
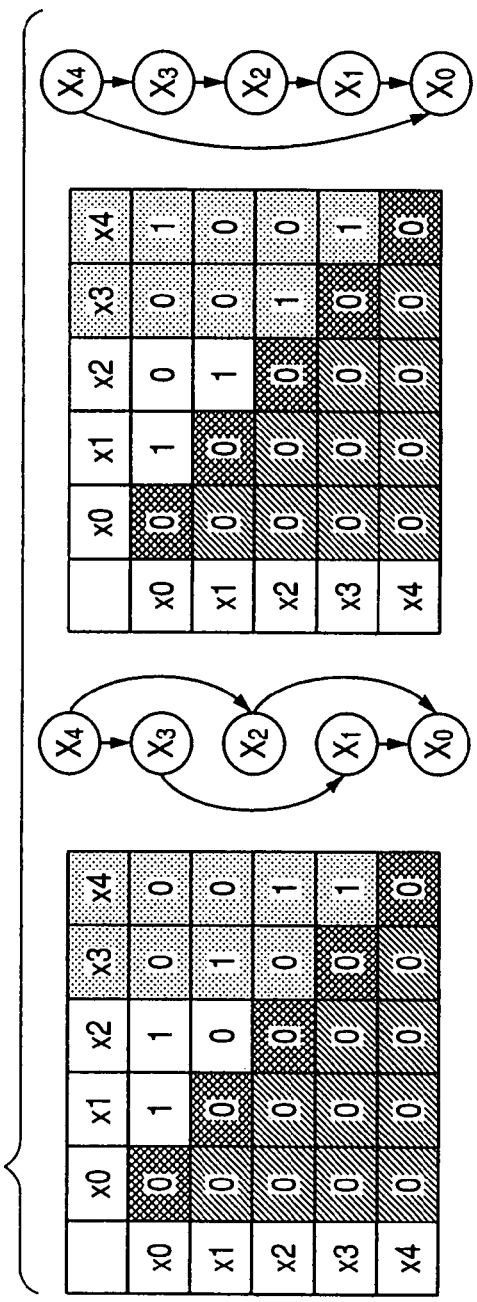

An example of the processing for crossovers in a case where parent individuals have the same orders is shown in FIGS. 7A and 7B. In this crossover processing, only connections are treated. As shown in FIG. 7A, with respect to two parent individual shaving orders $X_0$, $X_1$, $X_2$, $X_3$, and $X_4$, the point between the third and fourth nodes is taken as a crossover point. The following genes are exchanged. As a result, child individuals as shown in FIG. 7B are obtained. As can be seen from FIG. 7B, the connection of the parent individuals has been genetically transmitted to child individuals.

An example of processing for order crossovers in a case where parent individuals have different orders is shown in FIGS. 8A and 8B. For the processing for order crossovers, PMX (partially-mapped crossover) can be used, for example. In this PMX, 1) two crossover points are selected at random, 2) nodes between the crossover points are interchanged, 3) if each node is not used (3-1) within the individual, then it is used intact, if the node has been already used (3-2), then it is exchanged with a node from which an unexchanged node will be mapped, and if the node has also been already used (3-3), the node is exchanged with the node from which the unexchanged node will be mapped. At this time, the exchanged node inherits the connection with the parent node or child node of the present node itself. As shown in FIG. 8A, with respect to a parent individual having orders $X_0$, $X_1$, $X_2$, $X_3$, and $X_4$ and another parent individual having orders $X_2$, $X_0$, $X_4$, $X_3$, and $X_1$, if nodes between crossover points which are between the second and third nodes and between the fourth and fifth nodes, respectively, are interchanged according to a PMX procedure, child individuals as shown in FIG. 8B are obtained. As can be seen from FIG. 8B, orders and connections of the parent individuals have been genetically transmitted to the child individuals.

Where the parent individuals have the same orders as shown in FIG. 7A, if order crossover is performed according to a PMX procedure, the same child individuals as in FIG. 7B are obtained. That is, the processing for connection crossovers shown in FIGS. 7A and 7B is a special case of the processing for order crossovers (i.e., parent individuals have the same orders). Only if the processing for order crossovers is performed, the processing for connection crossovers is also carried out.

Subsequently, the processing for mutations in step S6 is described while taking its specific examples.

Figure 9A:
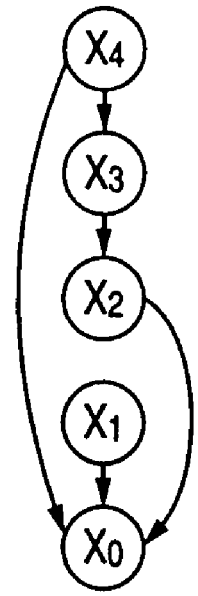
FIGS. 9A and 9B are diagrams showing examples of processing for connection mutations.
Figure 9B:
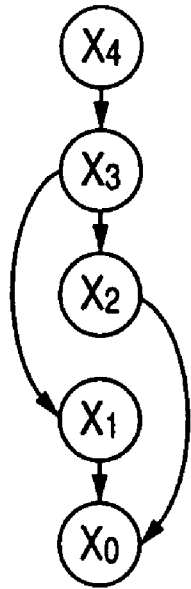

An example of the processing for connection mutations is shown in FIGS. 9A and 9B. This processing for connection mutations is realized by inverting a gene at an arbitrary gene locus onto an allele. As shown in FIG. 9A, with respect to a parent individual having orders $X_0$, $X_1$, $X_2$, $X_3$, and $X_4$, if gene "0" at a gene locus where the parent node is $X_3$ and the child node is $X_1$ is inverted onto an allele "1", and if gene "1" at a gene locus where the parent node is $X_4$ and the child node is $X_0$ is inverted onto an allele "0", child individuals as shown in FIG. 9B are obtained.

Figure 10A:
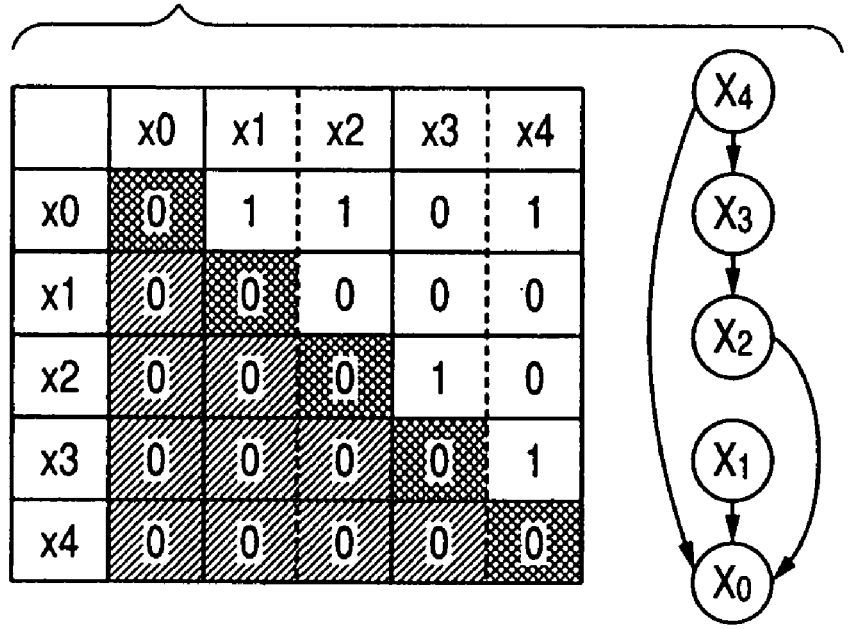
FIGS. 10A and 10B are diagrams showing examples of processing for order mutations.
Figure 10B:
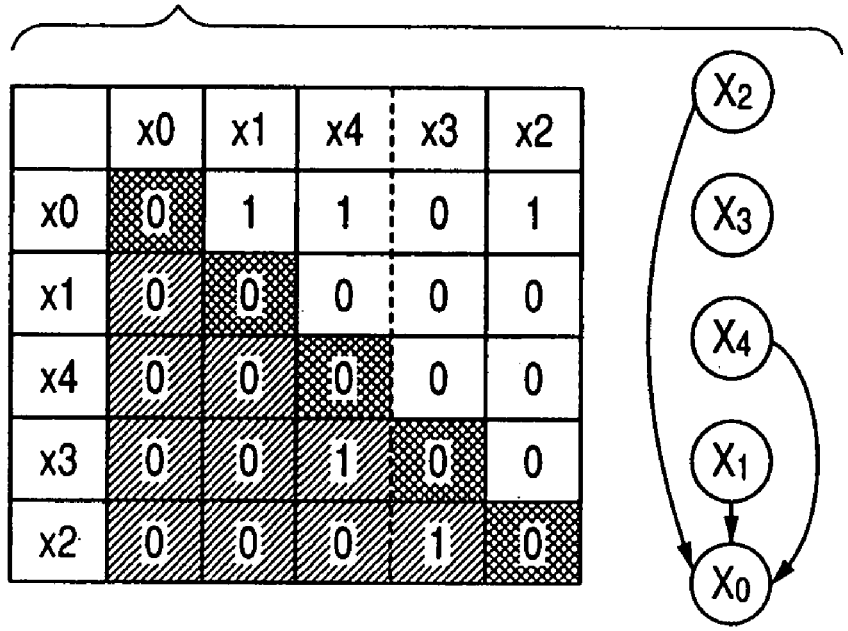

An example of processing for order mutations is shown in FIGS. 10A and 10B. For example, inversion mutation (IVM) can be used for the processing for order mutations. This inversion mutation (IVM) involves 1) selecting plural successive nodes at random and removing them and 2) inverting the orders of the removed nodes and then inserting the orders into random locations. As shown in FIG. 10A, with respect to a parent individual having orders $X_0$, $X_1$, $X_2$, $X_3$, and $X_4$, two successive nodes $X_2$ and $X_3$ are selected and removed. Their orders are inverted. If the orders are then inserted behind $X_4$, child individuals as shown in FIG. 10B are obtained.

Figure 11A:
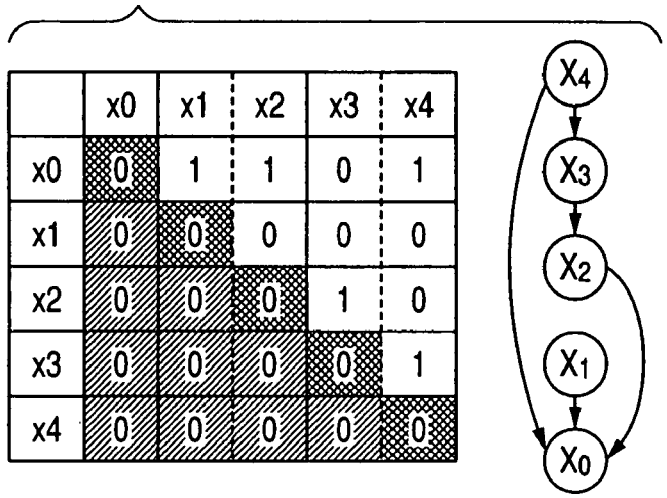
FIGS. 11A, 11B, and 11C are diagrams showing examples in which processing for connection mutations is performed after processing for order mutations.
Figure 11B:
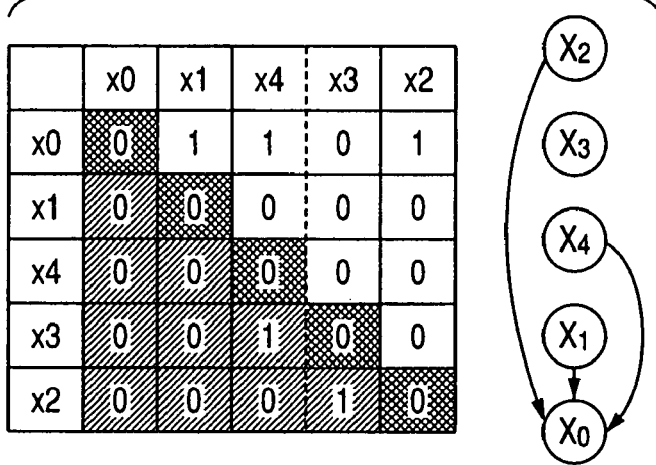
Figure 11C:
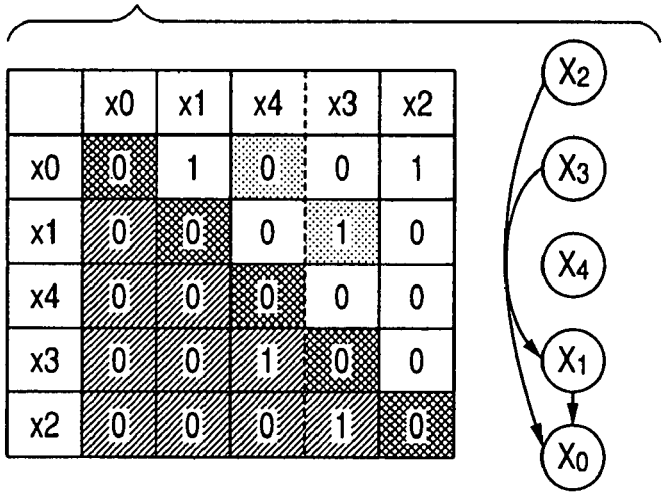

Since the processing for connection mutations shown in FIGS. 9A and 9B and the processing for order mutations shown in FIGS. 10A and 10B are independent of each other, both of these two kinds of processing can be performed. However, obtained child individuals differ according to which one of the kinds of processing is performed first. An example in which processing for connection mutations is performed after performing processing for order mutations is shown in FIGS. 11A-11C. As shown in FIG. 11A, with respect to a parent individual having orders $X_0$, $X_1$, $X_2$, $X_3$, and $X_4$, two successive nodes $X_2$ and $X_3$ are selected and removed. Their orders are inverted and then inserted behind $X_4$. That is, processing for order mutations is performed. As a result, an individual as shown in FIG. 11B is obtained. Furthermore, with respect to this individual, gene "0" at a gene locus where the parent node is $X_3$ and the child node is $X_1$ is inverted onto an allele "1". A gene "1" at a gene locus where the parent node is $X_4$ and the child node is $X_0$ is inverted onto an allele "0". That is, processing for connection mutations is performed. As a result, an individual as shown in FIG. 11C is obtained.

Figure 13A:
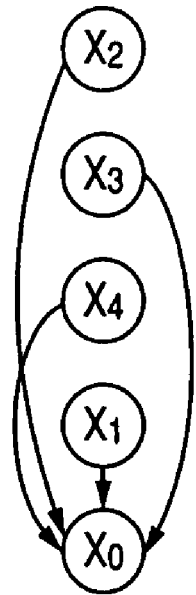
FIGS. 13A and 13B are diagrams showing examples in which genes are adjusted to prevent the number of parent nodes having a cause and effect relationship from exceeding the upper limit.
Figure 13B:
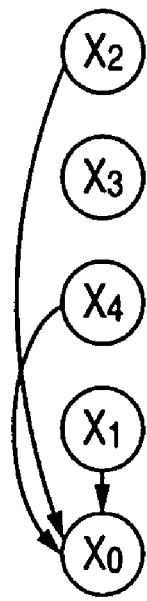

Referring back to FIG. 4, the number of parent nodes is limited in step S7, and then process goes back to step S2. That is, an upper limit (MaxFanIn) is previously set for the number of parent nodes (FanIn) having a cause and effect relationship with itself for each of child nodes of each individual. If the number of parent nodes having a cause and effect relationship with an arbitrary child node exceeds the upper limit as a result of the processing for crossovers and processing for mutations in steps S5 and S6, genes are so adjusted that the relation FanIn≦MaxFanIn holds. Examples in which the number of parent nodes is restricted in this way are shown in FIGS. 12A, 12B, 13A, and 13B. As shown in FIG. 12A, with respect to a parent individual having orders $X_0$, $X_1$, $X_2$, $X_3$, and $X_4$ and another parent individual having orders $X_2$, $X_0$, $X_4$, $X_3$, and $X_1$, if nodes between crossover points between the second and third nodes and between the fourth and fifth nodes, respectively, are interchanged according to a PMX procedure, child individuals as shown in FIG. 12B are obtained. In this figure, with respect to the child individuals on the left side, the number of parent nodes (FanIn) having a cause and effect relationship with child node $X_0$ is 4, which exceeds the upper limit (MaxFanIn) of 3. Accordingly, the relationship FanIn≦MaxFanIn is achieved by selecting gene "1" at a gene locus where the parent node is $X_3$ and the child node is $X_0$, for example, out of individuals shown in FIG. 13A and inverting the selected gene "1" onto allele "0" to produce individuals as shown in FIG. 13B.

When genes are inverted onto their alleles such that the relationship FanIn≦MaxFanIn is achieved, the inverted genes may be selected at random. The selection may be so made that the evaluated value of the individuals becomes highest. In the latter case, it may be necessary to calculate the evaluated value regarding individuals having child nodes for which the number of parent nodes has exceeded the upper limit. With respect to this individual, it may not be necessary to calculate the evaluated value in step S2. The evaluated value computed in step S7 can be exploited.

In this way, according to the learning apparatus 1 of the present embodiment, a quasi-optimum network structure can be built efficiently for an NP-hard problem by expressing the network structure of a Bayesian network (orders and connections) (i.e., individuals used in a genetic algorithm) in terms of a two-dimensional genotype, taking numerous individuals having the two-dimensional genotype as an initial population of individuals, searching the initial population of individuals for an optimum individual using a genetic algorithm, and taking the phenotype of the individual as the network structure of the Bayesian network.

Furthermore, the learning apparatus 1 makes it possible to totally or partially reflect designer's knowledge about the network structure in the initial population of individuals by converting the phenotype into a two-dimensional genotype and performing processing for mutations in a case where the designer has knowledge about the network structure (orders and connections). Where it is desired to fix orders and connections at some nodes, individuals having two-dimensional genotypes different from the fixed orders and connections may be regarded as lethal genes and removed from the subject of selection in the above step S4.

In addition, the learning apparatus 1 enables added learning of the network structure by creating an initial population of individuals from individuals obtained as a result of learning.

In the description of the flowchart illustrated in FIG. 4, the learning apparatus 11 performs both processing for crossovers and processing for mutations. Only one of the two kinds of processing may also be performed.

As shown in Eq. (1), the BD metric is chiefly composed of (i) $N_{ijk}$ determined by the network structure and learning data and (ii) $N'_{ijk}$ determined by the designer's prior knowledge. Generally, where the designer's prior knowledge can be defined for all i's and j's regarding some node $X_i$ and its parent node such as p ($v_{ik}$, $w_{ij}$), $N'_{ijk}$ are calculated according to the following Eq. (3). In this Eq. (3), N' is referred to as the equivalent sample size, and is a parameter for assuming what number of samples are used to represent information obtained from the prior knowledge.

$$N'_{ijk} = p(v_{ik}, w_{ij}) \times N' \quad (3)$$

Where the designer has prior knowledge about the network structure, the designer's prior knowledge can be reflected by substituting the $N'_{ijk}$ calculated in this way into the above Eq. (1).

Meanwhile, where the designer does not have such prior knowledge, it is customary to calculate the BD metric under the condition $N'_{ijk}=1$. The BD metric calculated under the condition $N'_{ijk}=1$ is especially referred to as a K2 metric.

However, where the assumption $N'_{ijk}=1$ is made in this way, the values of calculated BD metric of directed acyclic graphs (DAGs) might be different if the graphs belong to the same Morkov equivalent class that results in the same inferential result.

As an example, a network structure made up of four nodes of Cloudy, Sprinkler, Rain, and WetGrass as shown in FIG. 14 is now considered.

Of the directed acyclic graphs (DAGs) shown in FIG. 14, G1 to G3 have the same links and have the same uncoupled head-to-head meetings (Sprinkler→WetGrass←Rain) and, therefore, these three graphs can be represented in the same DAG pattern gp. However, G4 has the same link as G1 to G3 but has other uncoupled head-to-head meetings (Sprinkler→Cloudy ←Rain) and so cannot be represented in the DAG pattern gp. An evaluated value (logarithm of the BD metric) calculated under the condition $N'_{ijk}=1$ when some learning data is given to the four DAGs is also shown in FIG. 14.

Figures 15A, 15B:
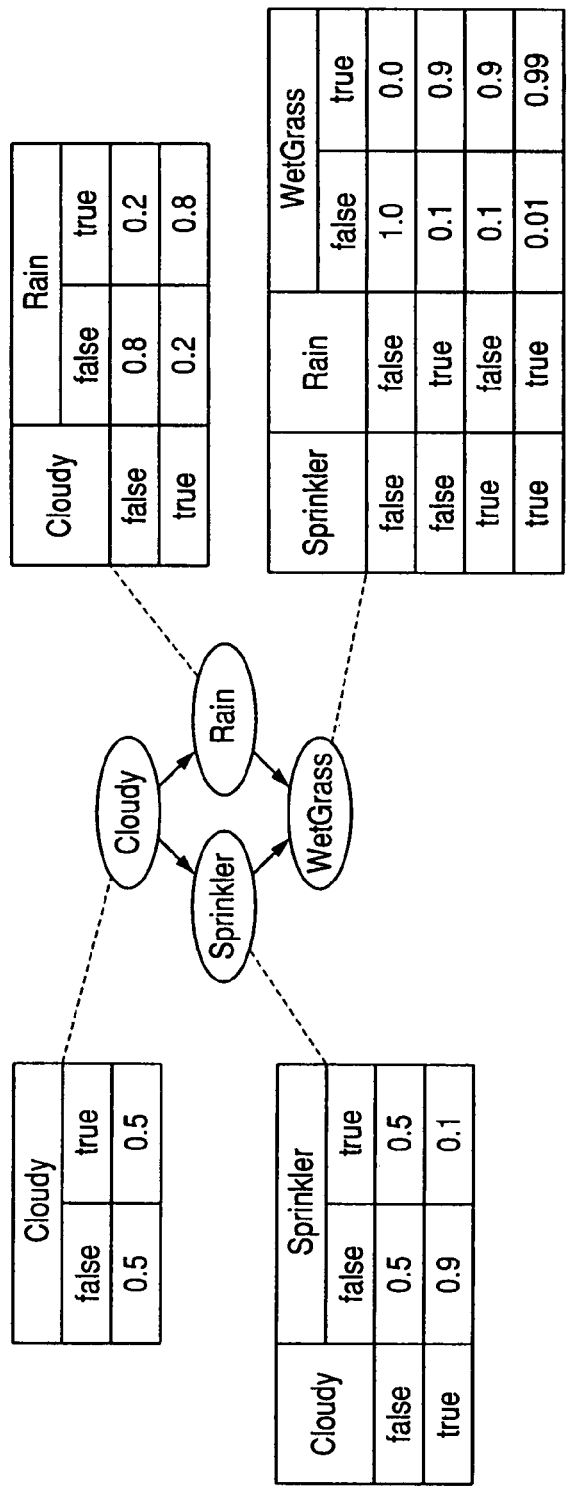
FIGS. 15A and 15B are diagrams illustrating a procedure for creating learning data used when the evaluated value of FIG. 14 was calculated.

The learning data was created in the following manner using a DAG having a conditional probability table (CPT) as shown in FIG. 15A. That is, at Cloudy that is the node of the highest degree of parentage, it is first probabilistically determined whether the node is true or false based on the conditional probability table. It is now assumed that Cloudy=true. At each of Sprinkler and Rain that are child nodes of the Cloudy, a decision is then made probabilistically as to whether the node is true or false based on the conditional probability table under the parental condition. It is here assumed that Sprinkler=false and Rain=true. Then, at WetGrass that is the child node of the Sprinkler and Rain, the node is probabilistically determined whether the node is true or false based on the conditional probability table under the parental condition. In this way, learning data about one case is created. Learning data about 1,000 cases are created similarly as shown in FIG. 15B.

As shown in FIG. 14, where the assumption $N'_{ijk}=1$ is made, the evaluated value of G1 and G3 is different from the evaluated value of G2. Where the assumption $N'_{ijk}=1$ is made in this way, DAGs which should produce the same evaluated value and belong to the same Markov equivalent class, i.e., DAGs that can be represented in the same DAG pattern, may produce different calculated values of BD metric.

Accordingly, the assumption $N'_{ijk}=1$ is not suitable in a case where the logarithm of the BD metric is taken as an evaluated value as described above and a search is made for an optimum network structure based on the evaluated value.

Accordingly, in the present embodiment, the $N'_{ijk}$ is determined as follows such that DAGs belonging to the same Markov equivalent class produce the same calculated value of BD metric.

First, in a first method, the number of states at nodes $X_i$ is set to $r_i$. Their respective joint probability distributions p ($X_0$, $X_1$, ..., $X_{n-1}$) are all calculated according to the following Eq. (4).

$$p(X_0, X_1, \ldots X_{n-1}) = 1 \bigg/ \prod_{i=0}^{n-1} r_i \quad (4)$$

Simultaneous occurrence frequencies c ($X_0, X_1, \ldots, X_{n-1}$) are all set to 1 such that the effect of prior knowledge is minimized. Under this state, $N'_{ijk}$ is determined as given by the following Eq. (5).

$$N'_{ijk} = \left(\prod_{i=0}^{n-1} r_i\right) / r_i q_i \qquad (5)$$

In this first method, the value of the $N'_{ijk}$ is increased with increasing the number of nodes n and the number of states $r_i$. Therefore, there is the possibility that the effect $N_{ijk}$ of the learning data becomes smaller than the effect $N'_{ijk}$ of prior knowledge. Accordingly, in a second method, the relationship $N'_{ijk}=0$ is introduced to eliminate the effect of the prior knowledge.

Figure 16:
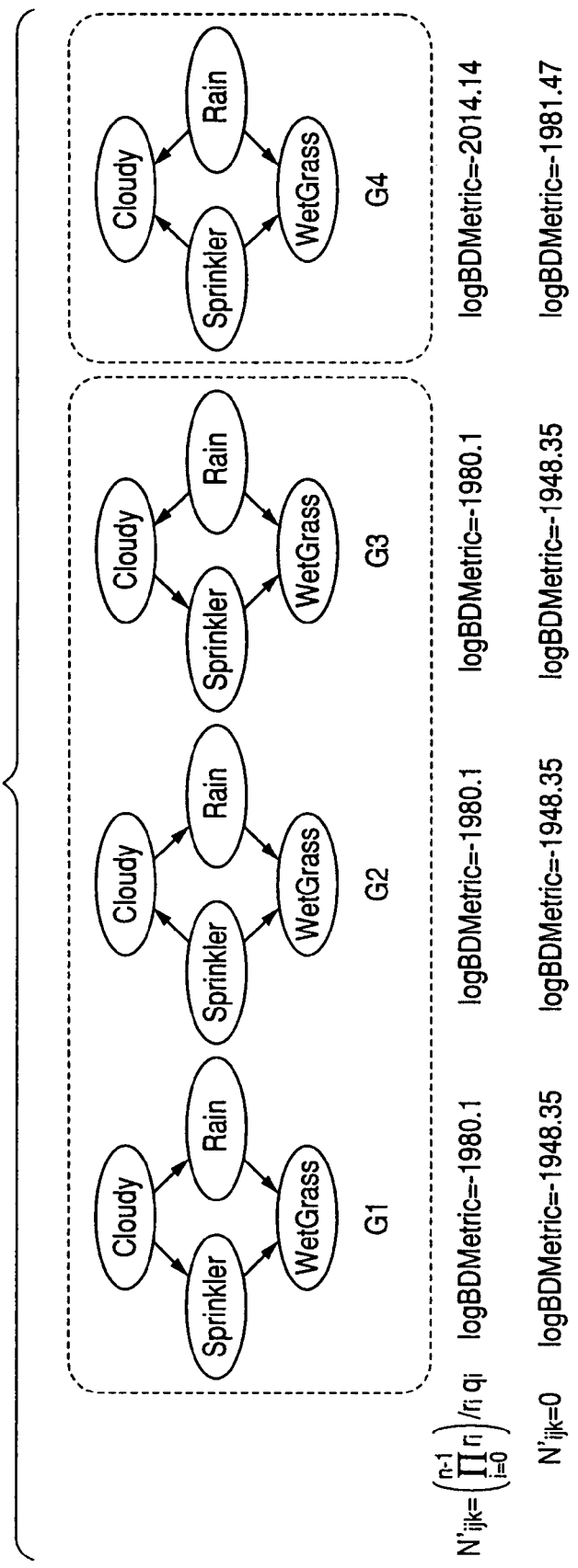
FIG. 16 is a diagram showing four directed acyclic graphs and an evaluated value calculated by the procedure of an embodiment.

With respect to the four DAGs shown in FIG. 14, evaluated values calculated using $N'_{ijk}$ determined by the first and second methods are shown in FIG. 16. As shown in FIG. 16, in a case where $N'_{ijk}$ is determined by the first and second methods, the evaluated values of G1 to G3 are all the same.

A specific embodiment is described below. In this embodiment, a model of a Bayesian network for inferring behavior of a user by observing the user with a camera mounted to a television receiver (hereinafter abbreviated as the TV receiver) is assumed. The network structure is constructed based on previously prepared learning data.

The learning data has been prepared in the manner described below.

Figure 17:
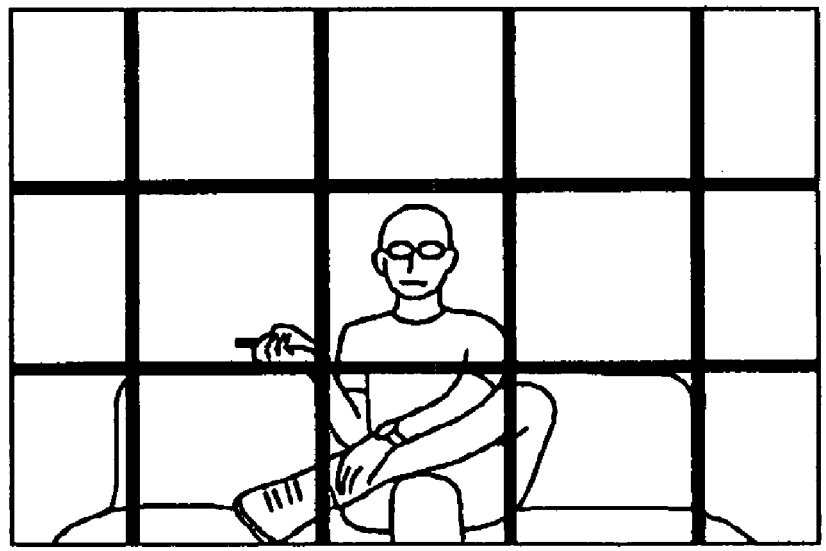
FIG. 17 is a diagram illustrating a procedure for obtaining specific learning data.

First, pictures of the user who makes manipulations in front of the TV receiver are taken by the camera. From the input images, four kinds of parameters ((1) FaceDir: (FaceDirection) direction of the face; (2) FacePlace: the position of the face; (3) FaceSize: the size of the face; and (4) OptiFlow (OpticalFlowDirection): motion of the user) have been recognized as shown in FIGS. 17-20. With respect to the direction of the face (FaceDir), each input image is divided into 3 segments in the up-and-down direction and into 5 segments in the left-and-right direction as shown in FIG. 17. It is assumed that the user's face is in the center position. There are 16 states in total. That is, the face is directed at any one of the 15 regions. In the 16th state, the user's face does not exist within the input image.

Figure 18:
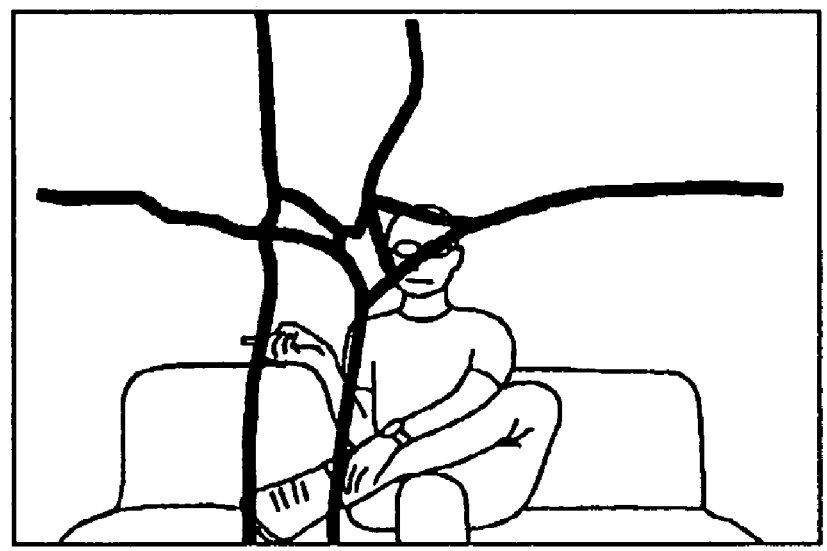
FIG. 18 is a diagram illustrating a procedure for obtaining specific learning data.
Figure 19:
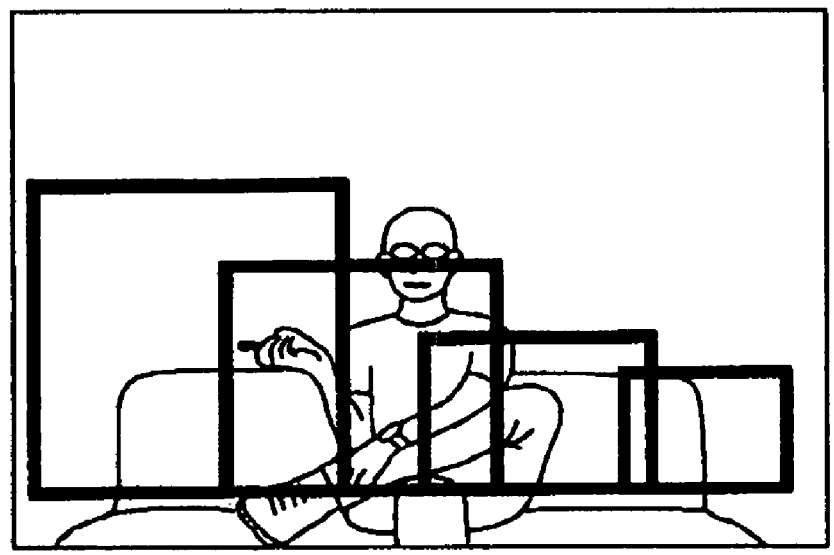
FIG. 19 is a diagram illustrating a procedure for obtaining specific learning data.
Figure 20:
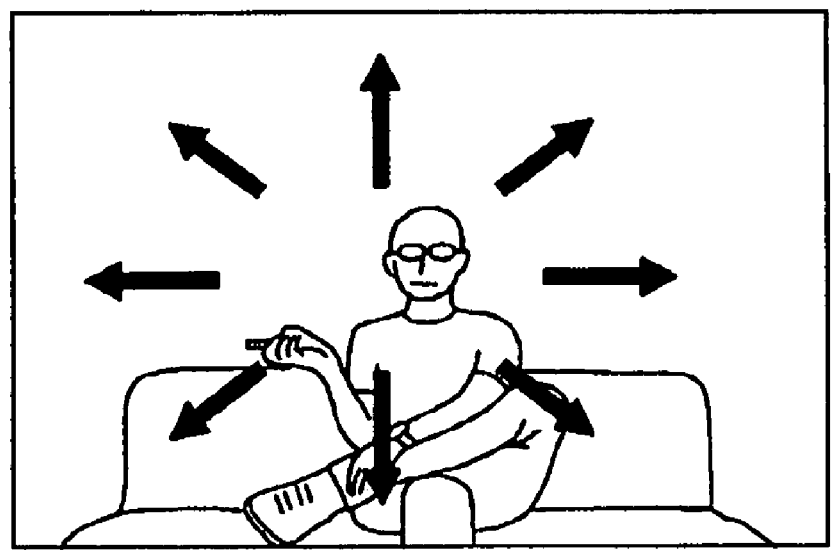
FIG. 20 is a diagram illustrating a procedure for obtaining specific learning data.

With respect to the position of the face (FacePlace), information about the position of the face indicated by all the learning data is classified, for example, as shown in FIG. 18 using a vector quantization procedure. Ten states are produced in total. That is, the user's face is judged to be present in any one of the 9 regions. In the tenth state, the user's face does not exist in the input image.

With respect to the size of the face (FaceSize), five states are produced in total. That is, the size of the user's face is judged to be closest to any one of 4 sizes shown in FIG. 19. In the fifth state, the user's face is judged not to be present within the input image. With respect to the motion of the user (OptiFlow), nine states are produced in total. That is, the direction of the motion of the user is judged to be closest to any one of the 8 directions shown in FIG. 20. In the ninth state, no motion is found in the input image.

The results of the recognitions have been labeled in the following four ways:

(1) Channel (Communication Channel): whether the user faces the TV receiver.

(2) ComSignal (Communication Signal): whether the user is manipulating the TV receiver.

(3) UserGoalTV: whether the user is conscious of the TV receiver.

(4) UserPresence: whether user is present ahead of the TV receiver. All the labeling results are indicated by binary form: Yes or No.

Furthermore, to treat dynamic events, the time sequence in which the aforementioned results of recognitions and labeling operations occur are discussed. A data item occurring at some instant of time is suffixed with "_t__0". A data item occurring one tick earlier is suffixed with "_t__1". A data item occurring 2 ticks earlier is suffixed with "_t__2". One example of expression is "FacePlace_t__0".

Where the four kinds of results of recognitions and four kinds of label are used each for 3 ticks, the number of nodes is 24. Assuming that the tick interval is 1 second, learning data about 165,000 cases have been prepared from a sequence of motion pictures (30 frames/second) for about 90 minutes.

Figure 21:
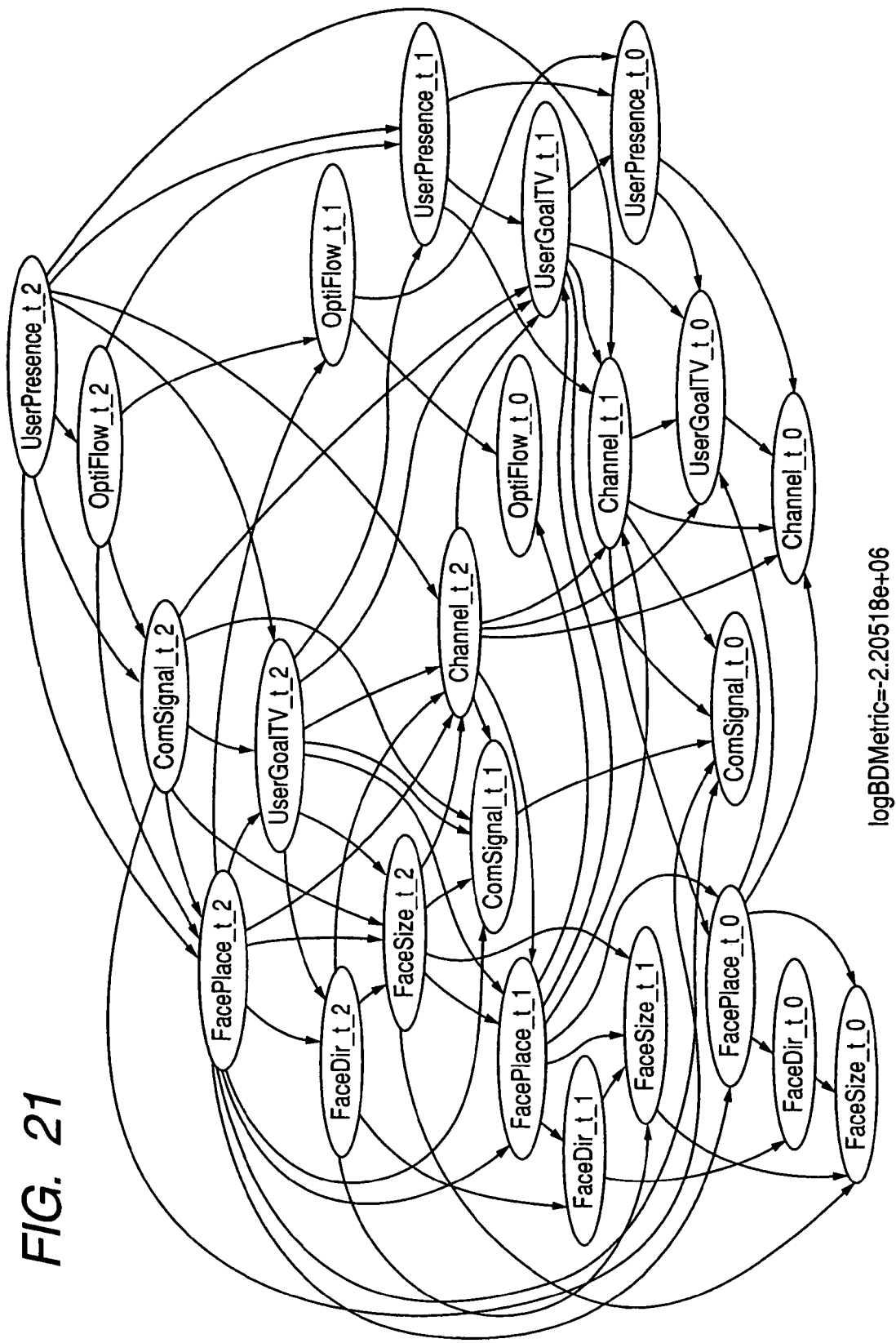
FIG. 21 is a diagram showing a network structure obtained by a K2 algorithm based on learning data.
Figure 22:
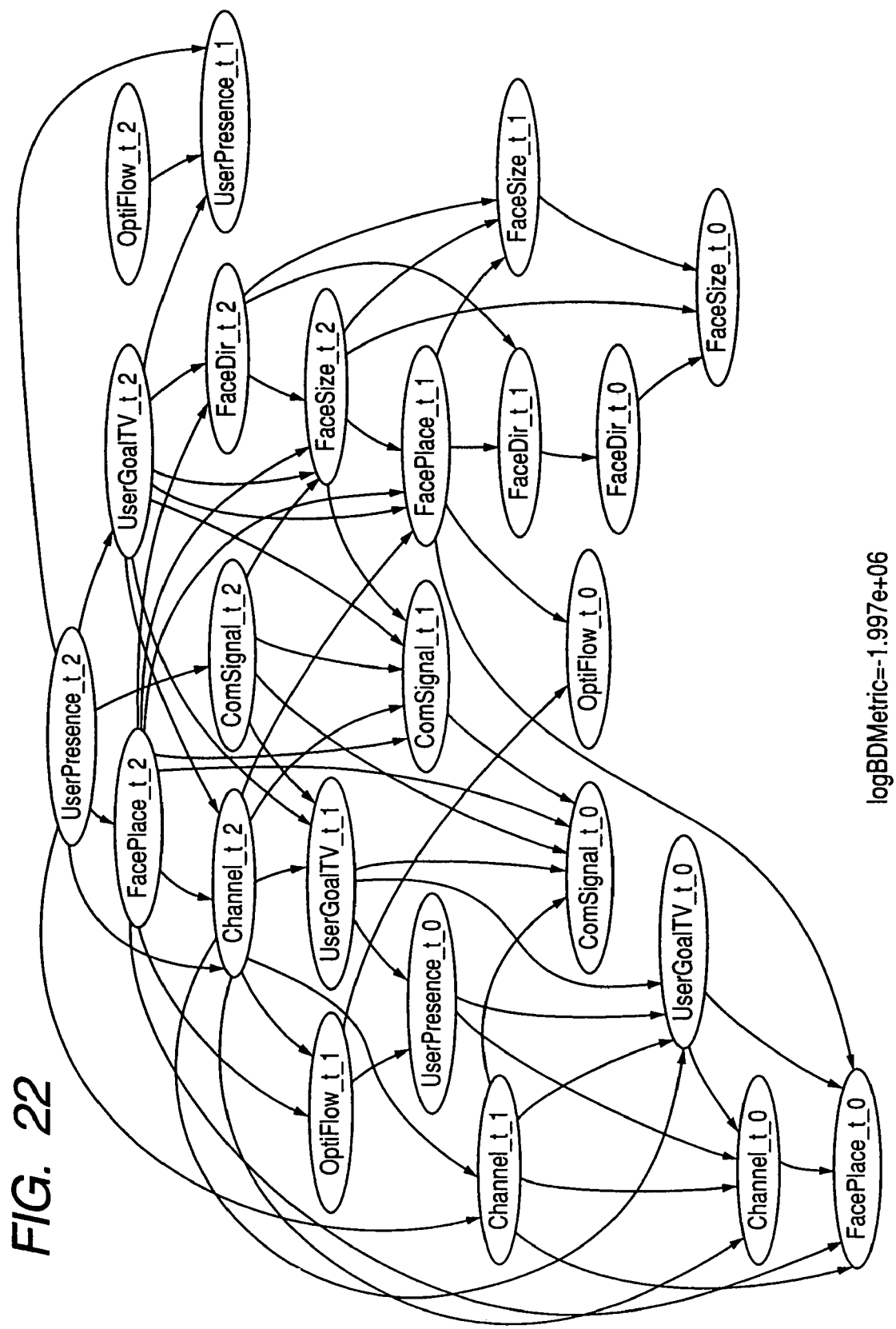
FIG. 22 is a diagram showing a network structure of the twentieth generation when added learning was done using the network structure of FIG. 21 as an initial structure.
Figure 23:
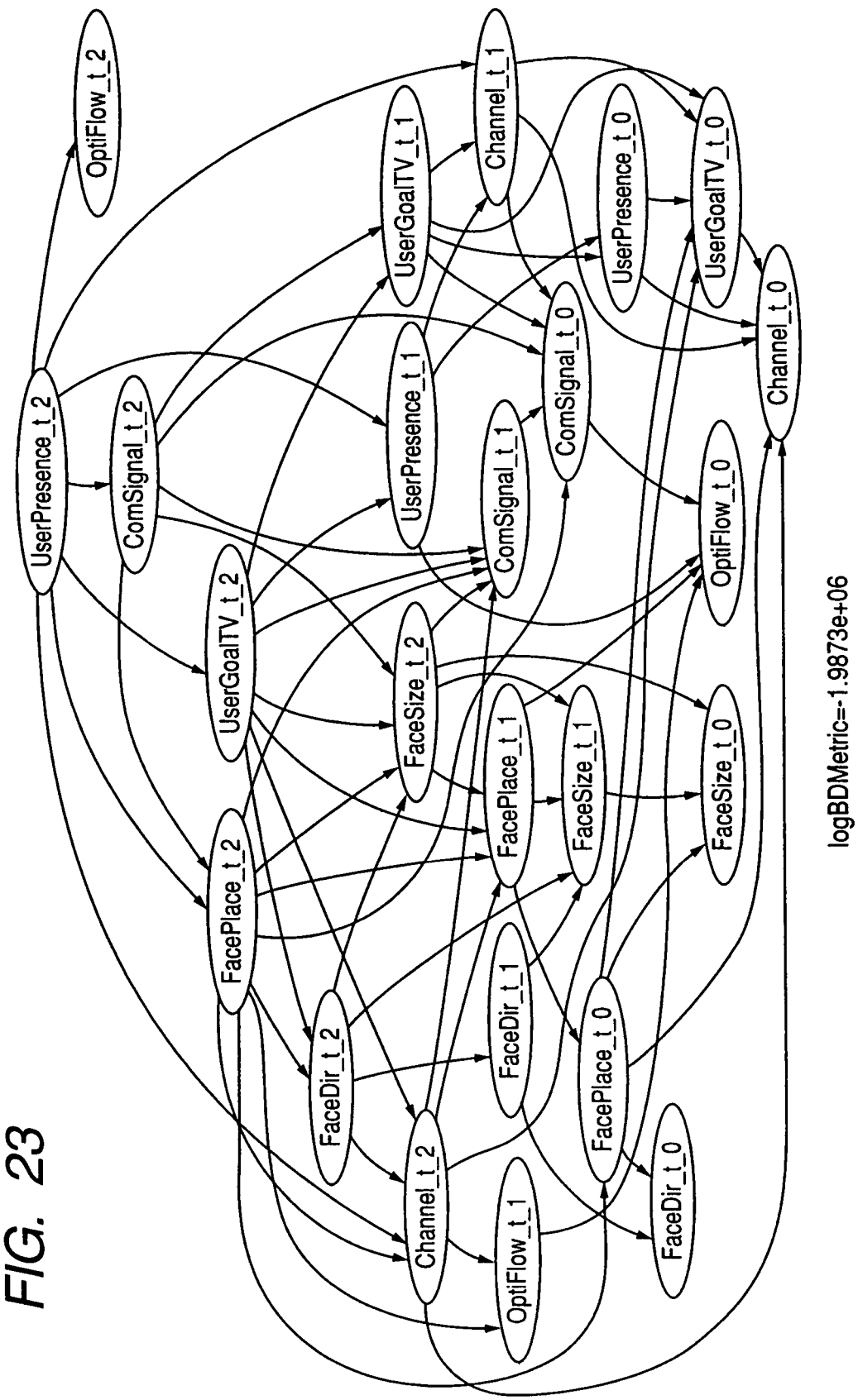
FIG. 23 is a diagram showing a network structure of the fortieth generation when added learning was done using the network structure of FIG. 21 as an initial structure.
Figure 24:
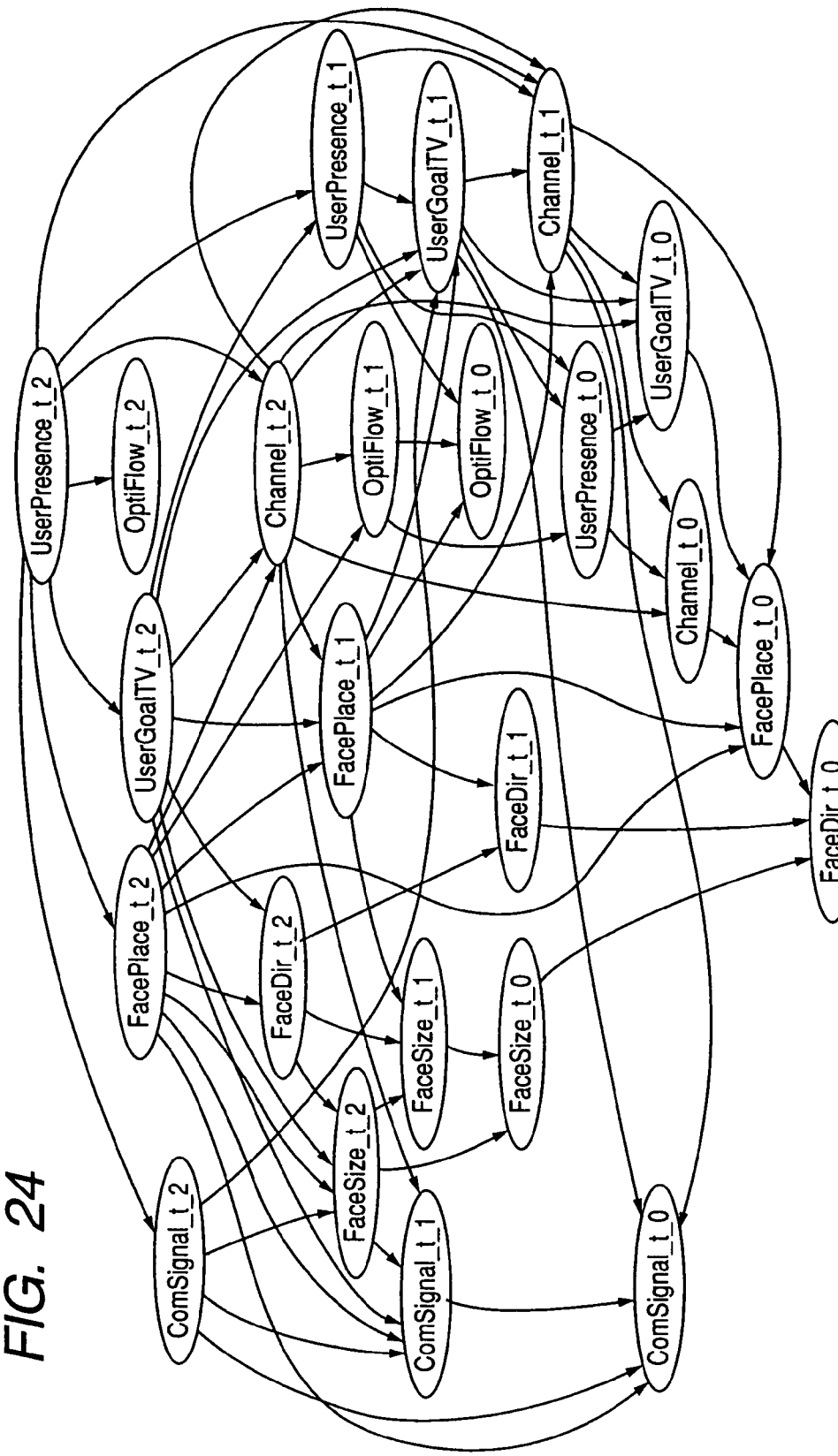
FIG. 24 is a diagram showing a network structure of the sixtieth generation when added learning was done using the network structure of FIG. 21 as an initial structure.
Figure 25:
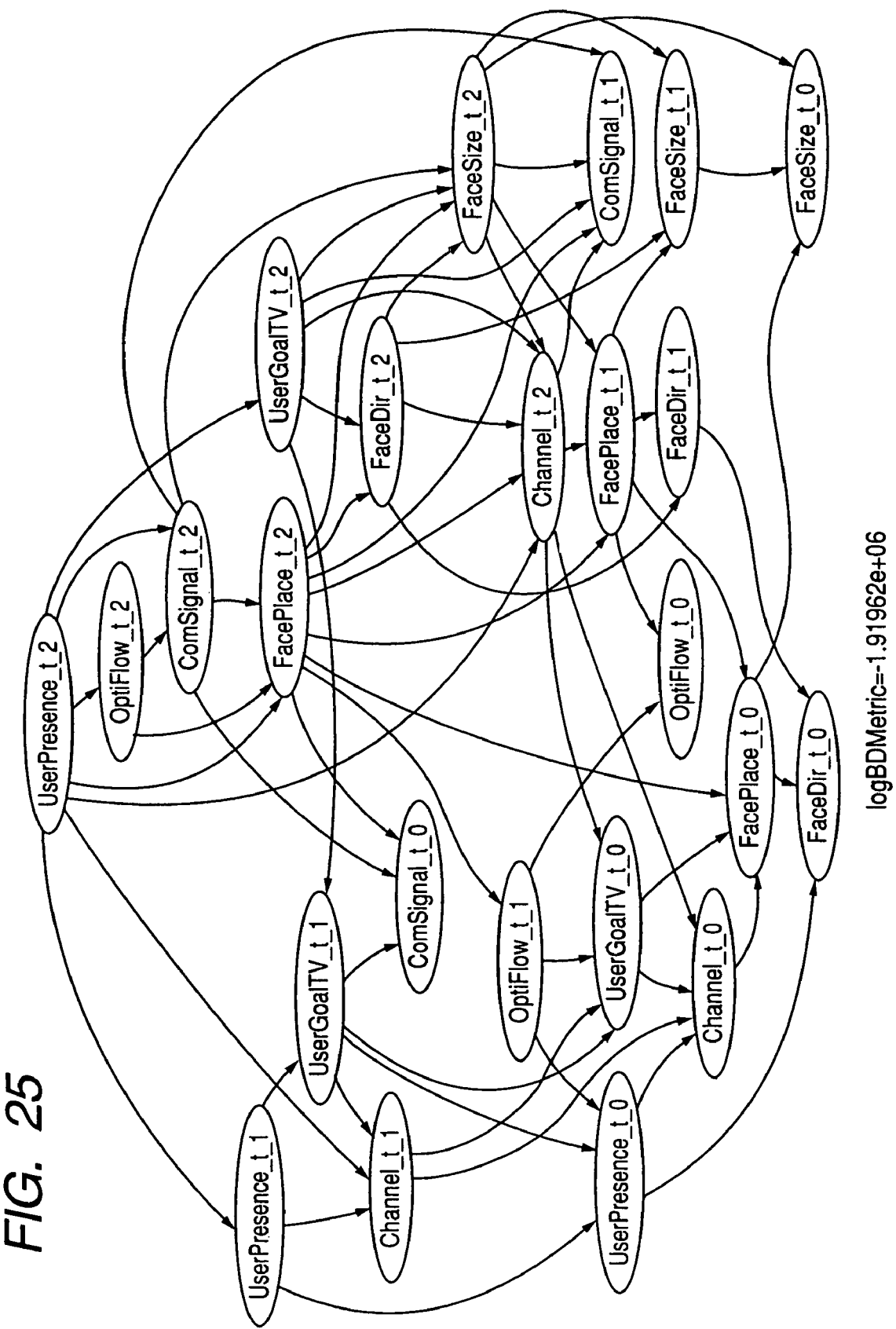
FIG. 25 is a diagram showing a network structure of the eightieth generation when added learning was done using the network structure of FIG. 21 as an initial structure.

A network structure built using a K2 algorithm based on the learning data is shown in FIG. 21. At this time, orders between nodes are set as follows:

FacePlace_t__0, FaceSize_t__0, FaceDir_t__0, OptiFlow_t__0, Channel_t__0, ComSignal_t__0, UserGoalTV_t__0, UserPresence_t__0, FacePlace_t__1, FaceSize_t__1, FaceDir t__1, OptiFlow_t__1, Channel_t__1, ComSignal_t__1, UserGoalTV_t__1, UserPresence_t__1, FacePlace_t__2, FaceSize_t__2, FaceDir_t__2, OptiFlow_t__2, Channel_t__2, ComSignal_t__2, UserGoalTV_t__2, UserPresence_t__2

In the present embodiment, added learning of the network structure has been done using the network structure shown in FIG. 21 as an initial structure and based on the same learning data as the aforementioned learning data. Transition of the network structure during the learning process is shown in FIGS. 22-25, which show network structures of the 20th generation, 40th generation, 60th generation, and 80th generation, respectively. As can be seen from FIGS. 21-25, the evaluated value (logarithm of BD metric) of elite individuals increased as the generation alteration was repeated. The evaluated value did not vary from the 80th generation to the 200th generation. Consequently, it can be said that a convergence was achieved at about 80th generation and that a quasi-optimum network structure was built. The final orders between the nodes are as follows:

FaceDir_t__0, FaceSize_t__0, FacePlace_t__0, Channel_t__0, OptiFlow_t__0, UserPresence_t__0, FaceDir_t__1, UserGoalTV_t__0, FaceSize_t__1, FacePlace_t__1, ComSignal_t__1, Channel_t__2, Channel_t__1, ComSignal_t__0, OptiFlow_t__1, FaceSize_t__2, FaceDir_t__2, FacePlace_t__2, ComSignal_t__2, OptiFlow_t__2, UserGoalTV_t__1, UserGoalTV_t__2, UserPresence_t__1, UserPresence_t__2

The present invention may also be applied to a learning apparatus that forms an embodiment (hereinafter referred to as the second embodiment) different from the above-described embodiment. In this second embodiment, a network structure of a dynamic Bayesian network is built based on learning data. In the dynamic Bayesian network, a dynamic cause and effect relationship between plural nodes is represented by a directed graph. A learning apparatus according to the second embodiment of the present invention is described below.

Figure 26:
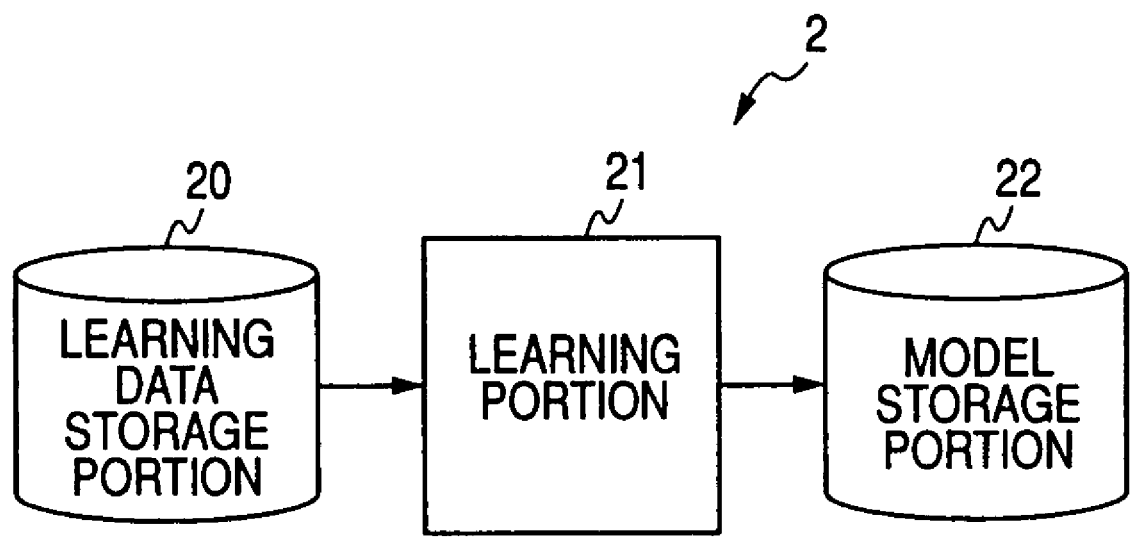
FIG. 26 is a schematic diagram of a learning apparatus according to a second embodiment of the present invention.

First, the configuration of the learning apparatus according to the second embodiment of the present invention is schematically shown in FIG. 26. The learning apparatus, generally indicated by reference numeral 2, includes a learning data storage portion 20, a learning portion 21, and a model storage portion 22. Detailed description of those structural portions of this learning apparatus which are identical with their counterparts of the learning apparatus 1 is omitted.

In the Bayesian network of the aforementioned learning apparatus 1, a probability distribution of a fixed number of nodes is described. In the dynamic Bayesian network of the learning apparatus 2, the probability distribution of the fixed number of nodes is expanded to a time sequential process.

As given by Eq. (6), the time sequential process is set to a Markovian chain in a probability variable (random variable) X.

$$P(X[t+1]|X[0], \ldots, X[t]) = P(X[t+1]|X[t]) \qquad (6)$$

It is also assumed that the time sequential process is stationary and that $P(X[t+1]|X[t])$ is independent of t.

Thus, in a dynamic Bayesian network, the phenotype of individuals in which three nodes (e.g., from $X_1$ to $X_3$) are present is represented by a phenotype of an initial network $B_0$ identifying the distribution of nodes in the initial state X[0] at t=0 as shown in FIG. 27A and a phenotype of a transition network $B_t$ identifying the transition probability $P(X[t+1]|X[t])$ at every t as shown in FIG. 27B.

In this example, the set $(B_0, B_t)$ of the initial network $B_0$ and transition network $B_t$ can be expressed in a semi-infinite form X[0], ..., x[∞] as shown in FIG. 27C or an expanded form $X[_0]$, ..., X[T] as shown in FIG. 27D.

The dynamic Bayesian network expressed by the set $(B_0, B_t)$ of the initial network $B_0$ and transition network $B_t$ in this way is referred to as a 2TBN (2-time-slice Bayesian network).

Learning data used in building a model of a dynamic Bayesian network is stored in the learning data storage portion 20. For example, where three nodes from $X_1$ to $X_3$ a represent, $X_1[0]$, $X_2[0]$, and $X_3[0]$ which are nodes at t=0 are stored in the learning data storage portion 20.

The learning portion 21 builds a model of a dynamic Bayesian network based on the learning data stored in the learning data storage portion 20. The model built by the learning portion 21 is stored in the model storage portion 22.

Processing for building a network structure in the learning portion 21 is next described. In the following, it is assumed for the sake of simplicity that there are three nodes from $X_1$ to $X_3$.

The learning portion 21 builds the network structure of the dynamic Bayesian network. That is, the learning portion expresses individuals used in a genetic algorithm by a two-dimensional genotype of the initial network $B_0$ as shown in FIG. 28A and a two-dimensional genotype of the transition network $B_t$ as shown in FIG. 28B.

In the two-dimensional genotype of the initial network $B_0$ shown in FIG. 28A, the orders between nodes in the rows and columns are given by $X_1$, $X_2$, and $X_3$, and the orders in the rows are always identical with the orders in the columns, in the same way as the learning apparatus 1 according to the above-described embodiment. Furthermore, "0" and "1" which are alleles at gene loci of triangular components located over the diagonal components indicate connections from parent nodes to child nodes. Here, "1" indicates that there is no cause and effect relationship between parent and child nodes. "1" indicates that there is a cause and effect relationship between parent and child nodes. The diagonal components correspond to a self-loop. "0" and "1" that are alleles at gene loci of triangular components located under the diagonal components indicate connections from child to parent nodes. However, in order to assure acyclicity of the network structure, it is assumed that genes less than the diagonal components do not develop their traits. Accordingly, the phenotype of individuals having the two-dimensional genotype as shown in FIG. 28A is as shown in FIG. 27A.

On the other hand, in the two-dimensional genotype of the transition network $B_t$ shown in FIG. 28B, the cause and effect relationship between nodes at instant of time t and the cause and effect relationship between nodes from instant of time (t−1) to instant of time t are expressed by different two-dimensional genotypes. With respect to the two-dimensional genotype expressing the cause and effect relationship between nodes at instant t, it is assumed that the genes less than the diagonal components do not develop their traits in the same way as in the case of the initial network $B_0$ at instant t=0. Meanwhile, with respect to the two-dimensional genotype expressing the cause and effect relationship between nodes from instant (t−1) to instant t, it is assumed that even genes less than the diagonal components develop their traits.

The learning portion 21 takes numerous individuals having such two-dimensional genotypes as an initial population of individuals, searches the initial population for an optimum individual using a genetic algorithm, and takes the phenotype of the individual as a quasi-optimum network structure.

Figure 29:
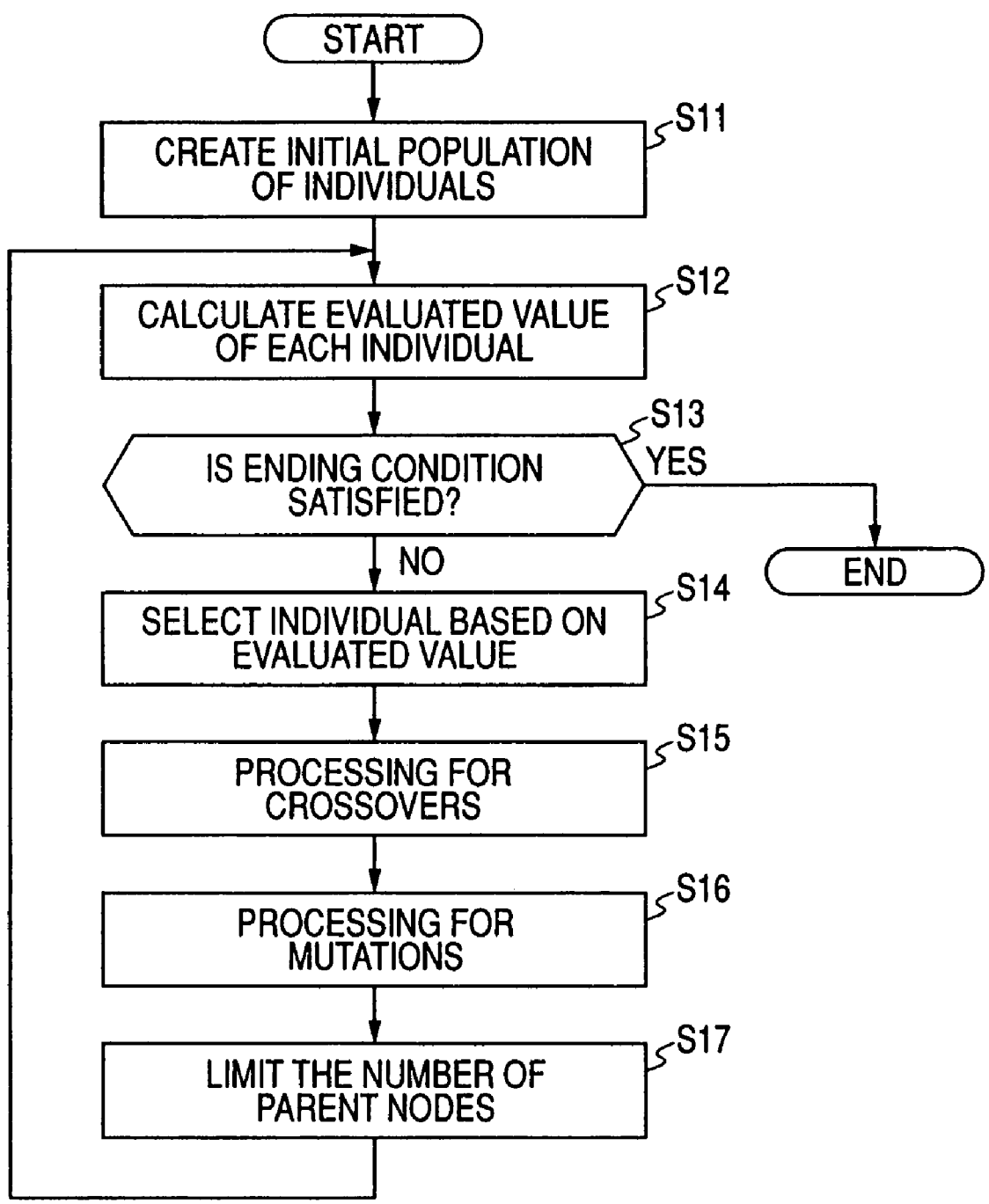
FIG. 29 is a flowchart illustrating a procedure for searching for an optimum individual using a genetic algorithm.

A procedure used by the learning portion 21 to search for an optimum individual using the genetic algorithm is now described with reference to the flowchart of FIG. 29. The processing operations are fundamentally identical with the processing operations illustrated in the flowchart of FIG. 4 referenced in the above-described embodiment. Detailed description of similar contents is omitted.

First, in step S11, the learning portion 21 creates an initial population of individuals. The initial population of individuals in 2TBN includes plural individuals having two-dimensional genotypes representing the initial network $B_0$, plural individuals having two-dimensional genotypes representing the cause and effect relationship between nodes at the instant of time t in the transition network $B_t$, and plural individuals having two-dimensional genotypes representing the cause and effect relationship between nodes from instant of time (t−1) to instant t in the transition network $B_t$.

Then, in step S12, the learning portion 21 calculates an evaluation value (i.e., fitness in the genetic algorithm) of each individual based on the learning data stored in the learning data storage portion 20. In particular, the BD metric (P(D|G)) in the 2TBN is calculated according to the following Eq. (7), and takes its logarithmic value as an evaluation value.

$$P(D|G) = \prod_{i=0}^{n-1} \prod_{j=0}^{q_i^G-1} \frac{\Gamma(N_{ij}^{'G})}{\Gamma(N_{ij}^{'G} + N_{ij}^{G})} \prod_{k=0}^{r_i-1} \frac{\Gamma(N_{ijk}^{'G} + N_{ijk}^{G})}{\Gamma(N_{ijk}^{'G})} \qquad (7)$$

In Eq. (7), D is learning data stored in the learning data storage portion 20 in the same way as in the learning apparatus 1 of the above-described embodiment. G indicates individuals used for the network structure of a dynamic Bayesian network, i.e., genetic algorithm. P(D|G) is the probability of D under the condition of G. Furthermore, in the same way as the learning apparatus 1 of the above-described embodiment, Γ is a gamma function and gives the relation ship Γ(n)=(n−1)!. In addition, as shown in FIG. 5A, let n be the number of nodes. The ith node is given by $X_i$. Let $v_{ik}$ be a value that $X_i$ can assume the kth time. $r_i$ indicates the number of values (number of states) that $X_i$ can assume. Furthermore, as shown in FIG. 5B, let $\pi_i$ be a parent node list of $X_i$. Let $w_{ij}$ be the jth pattern (value) that the $\pi_i$ can assume. $q_i$ indicates the number of patterns of $\pi_i$. $N^G_{ijk}$ indicates the number of data items within the learning data D whose values of $X_i$ are $v_{ik}$ and whose values of $\pi_i$ are $w_{ij}$. $N^G_{ij}$ is calculated according to the following Eq. (8). $N'^G_{ijk}$ and $N'^G_{ij}$ are associated with prior knowledge of the designer and can be treated similarly to $N^G_{ijk}$ and $N^G_{ij}$.

$$N_{ijk}^{\prime G} = \left(\prod_{i=0}^{n-1} r_i\right) / r_i q_i \quad (8)$$

Eq. (7) is represented as the product of the evaluation value of the individual having the network structure of the initial network $B_0$ and the evaluation value of the individual having the transition network $B_t$ as given by the following Eq. (9).

$$P(D|G)=P(D|B_0)\cdot P(D|B_t) \quad (9)$$

Figure 30:
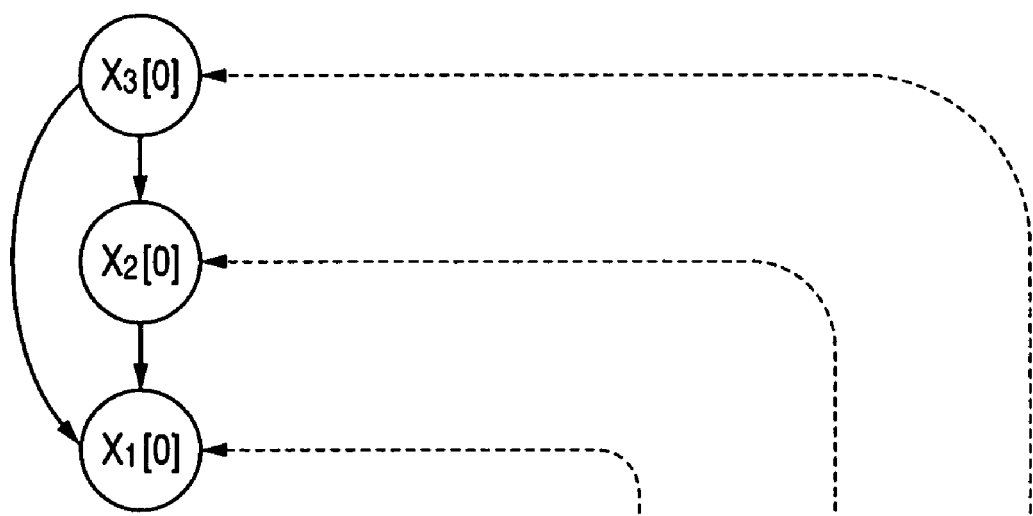
FIG. 30 is a diagram illustrating a technique for creating learning data used when an evaluation value is calculated.

($P(D|B_0)$) is given by the following Eq. (10). This ($P(D|B_0)$) is represented by using learning data about the nodes $X_1$, $X_2$, and $X_3$ at t=0 based on the conditional probability table of FIG. 30 and $N^{B_0}$ and $N^{\prime B_0}$ calculated from the structure of the initial network $B_0$.

$$P(D|B_0) = \prod_{i=0}^{n-1} \prod_{j=0}^{q_i^G-1} \frac{\Gamma(N_{ij}^{\prime B_0})}{\Gamma(N_{ij}^{\prime B_0} + N_{ij}^{B_0})} \prod_{k=0}^{r_i-1} \frac{\Gamma(N_{ijk}^{\prime B_0} + N_{ijk}^{B_0})}{\Gamma(N_{ijk}^{\prime B_0})} \quad (10)$$

Figure 31:
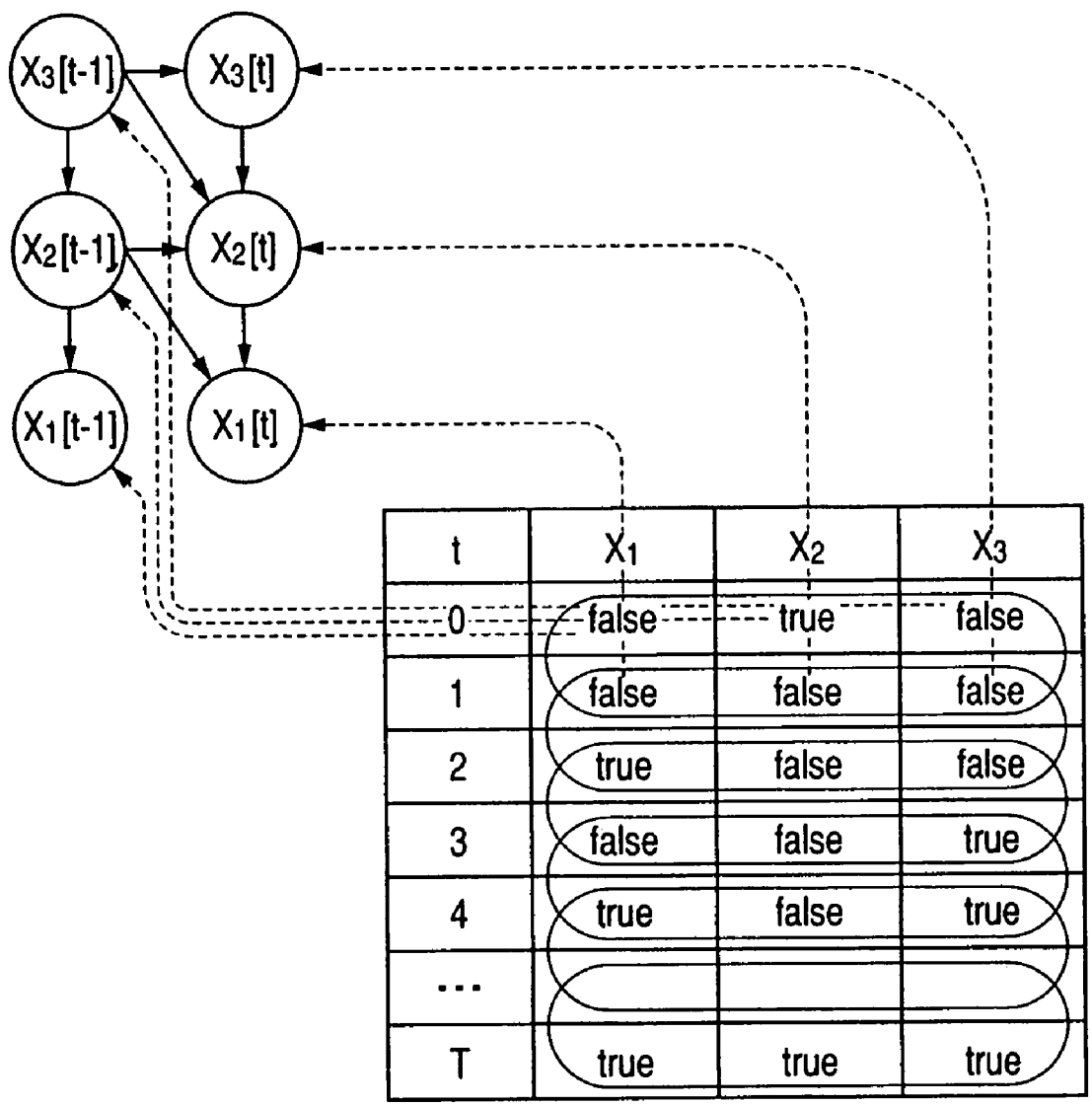
FIG. 31 is a diagram illustrating another technique for creating learning data used when an evaluation is calculated.

($P(D|B_t)$) is also given by the following Eq. (11). Learning data based on the conditional probability table of FIG. 31 is applied to the ($P(D|B_t)$) in such a way that learning data at nodes $X_1[t-1]$, $X_2[t-1]$, $X_3[t-1]$, $X_1[t]$, $X_2[t]$, $X_3[t]$ at two successive instants of time in the time sequential data included in the above-described learning data based on the conditional probability table is taken as one data set. Furthermore, ($P(D|B_t)$) is represented using $N^{B_t}$ and $N^{\prime B_t}$ calculated from the structure of the transition network $B_t$.

$$P(D|B_t) = \prod_{i=0}^{n-1} \prod_{j=0}^{q_i^G-1} \frac{\Gamma(N_{ij}^{\prime B_t})}{\Gamma(N_{ij}^{\prime B_t} + N_{ij}^{B_t})} \prod_{k=0}^{r_i-1} \frac{\Gamma(N_{ijk}^{\prime B_t} + N_{ijk}^{B_t})}{\Gamma(N_{ijk}^{\prime B_t})} \quad (11)$$

Subsequently, in step S13, the learning portion 21 makes a decision as to whether or not the end conditions are satisfied. If the conditions are not satisfied, control proceeds to step S14. If the conditions are satisfied, an individual providing the highest evaluation value is selected, and the processing is terminated.

Subsequently, in step S14, the learning portion 21 selects a next population of individuals from the present population of individuals based on the evaluation value. That is, based on the evaluation value, a given number of individuals are selected from the present population of individuals while permitting overlaps.

Subsequently, in steps S15 and S16, the learning portion 21 performs crossover processing on the individuals included in the present population of individuals according to a given crossover probability, and performs processing for inducing mutagenesis according to a given mutation rate.

Also, in this case, especially if a technique of classical genetic algorithm is used in crossover processing and mutation-inducing processing of orders in the same way as the learning apparatus 1 of the above-described embodiment, a framework in which no lethal genes are produced is necessary.

Subsequently, in step S17, the number of parent nodes is limited. Control again goes back to step S12.

In this way, according to the learning apparatus 2 according to the second embodiment of the present invention, the network structure (orders and connections) of 2TBN (i.e., individuals used in the genetic algorithm) is represented by (i) a two-dimensional genotype representing the initial network $B_0$, (ii) a two-dimensional genotype representing a cause and effect relationship between nodes at instant t in the transition network $B_t$, and (iii) a two-dimensional genotype representing a cause and effect relationship between nodes from instant (t−1) to instant t in the transition network $B_t$. A number of individuals having these two-dimensional genotypes are taken as an initial population of individuals. This initial population of individuals is searched for an optimum individual using a genetic algorithm. The phenotype of this individual is taken as the network structure of the dynamic Bayesian network. Thus, a quasi-optimum network structure can be efficiently built for an NP-hard problem.

In order to express dynamic events by a Bayesian network according to the above-described embodiment, it may be necessary to specify the number of time-slices in advance. It may be impossible to treat time-slices greater in number than the specified number.

On the other hand, according to the learning apparatus 2, it is possible to express an infinite number of time-slices by initial network $B_0$ and transition network $B_t$.

Furthermore, according to the learning apparatus 2, it is possible to learn graphical models of dynamic cause and effect relationships between nodes, using time sequential data from instant (t−1) to instant t and by applying 2TBN.

In addition, according to the learning apparatus 2, when graphical models of dynamic cause and effect relationship are learnt from the time sequential data, it is possible to prepare the network structure of the initial network structure $B_0$ as prior knowledge of the designer. Additional learning can be done from this network structure.

A specific example of the learning apparatus 2 according to the second embodiment of the present invention is hereinafter described. In this example, the user is observed by a camera attached to a television receiver in the same way as the learning apparatus 1 in the above embodiment. A model of a dynamic Bayesian network for inferring user's behaviors is assumed. The network structure is built based on previously prepared learning data.

The learning data is prepared in the manner described below in the same way as the learning apparatus 1.

First, the user who is manipulating in front of the television receiver is imaged by the camera. From the input image, the following four kinds of data are recognized as shown in FIGS. 17-20 which were referenced in the above embodiment.

(1) FaceDir (FaceDirection): direction of the face
(2) FacePlace: position of the face
(3) FaceSize: size of the face
(4) OptiFlow (OpticalFlowDirection): motion of the user The following four decisions are made on the results of the recognition and the results of the decisions are labeled to discriminate between them.

(1) Channel (Communication Channel): as to whether the user faces the TV receiver
(2) ComSignal (Communication Signal): as to whether the user is manipulating the TV receiver
(3) UserGoalTV: as to whether the user is conscious of the TV receiver
(4) UserPresence: as to whether the user is present ahead of the TV receiver Each label can assume two states: YES and NO.

About 165,000 sets of time-sequential data were prepared from an approximately 90-minute motion picture sequence at tick intervals of 1 s and learning was done.

A network structure built using a K2 algorithm based on the learning data is shown in FIG. 32.

Figure 32B:
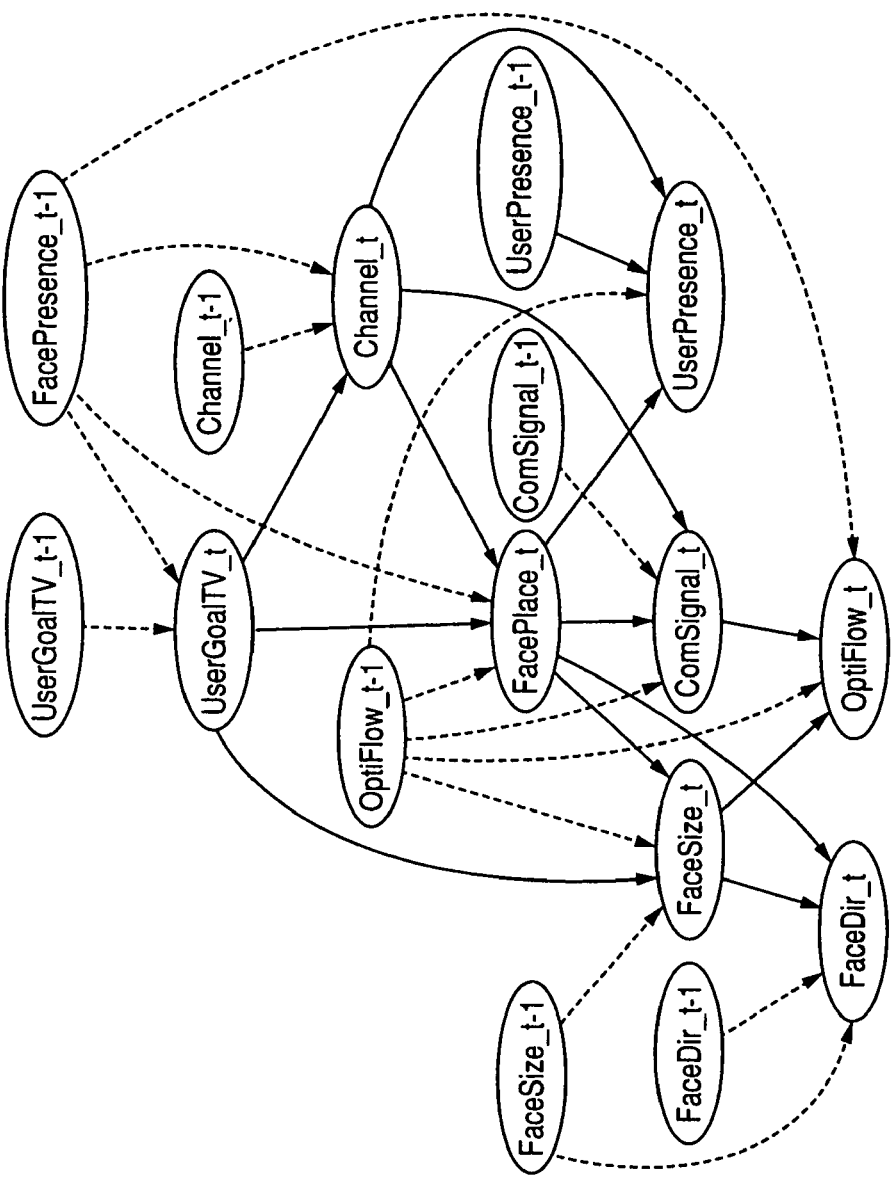
FIGS. 32A and 32B are diagrams showing network structures obtained with a K2 algorithm based on learning data.
Figure 32A:
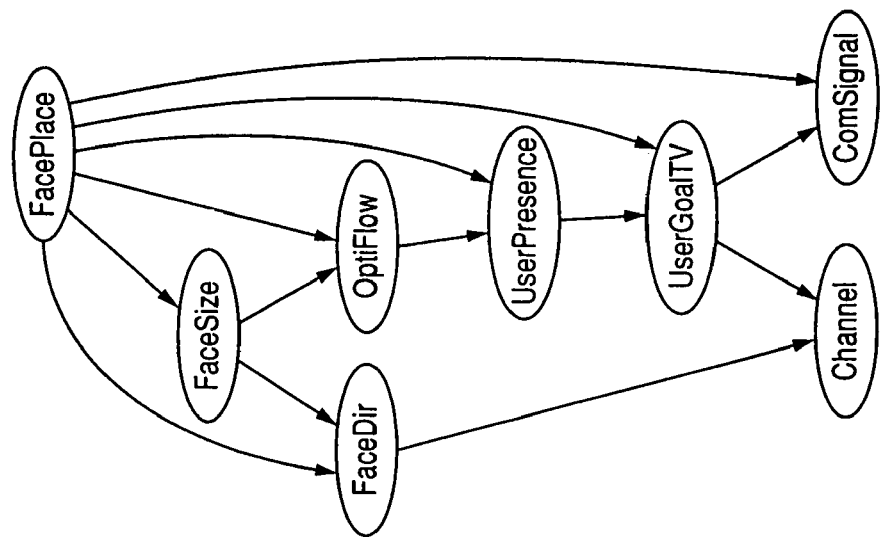

At this time, the orders between nodes in the initial network $B_0$ shown in FIG. 32A are as shown below.

PacePlace, FaceSize, FaceDir, OptiFlow, UserPresence, UserGoalTV, Channel, and ComSignal The orders between nodes in the transition network $B_t$ shown in FIG. 32B are as shown below.

FacePlace_t-1, FaceSize_t-1, FaceDir_t-1, OptiFlow_t-1, UserPresence_t-1, UserGoalTV_t-1, Channel_t-1, ComSignal_t-1, FacePlace_t, FaceSize_t, FaceDir_t, OptiFlow_t, UserPresence_t, UserGoalTV_t, Channel_t, ComSignal_t While the best mode for implementing the present invention has been described so far, the invention is not limited to the above-described embodiments. Of course, various modifications can be made thereto without departing from the scope of the present invention delineated by the accompanying claims.

What is claimed is:

1. A learning apparatus for building, based on learning data and a time sequential process, a network structure of a dynamic Bayesian network for inferring behavior of a user, wherein in the network a cause and effect relationship between plural nodes is represented by a directed graph, the learning apparatus comprising:
   an image capturing device for observing the user,
      wherein the image capturing device captures one or more images of the user;
   storage means in which the learning data is stored; and
   learning means for building the network structure based on the learning data;
   wherein the learning means
      recognizes one or more characteristics of the user based on one or more parameters including direction, position, size and motion of the user in one or more regions of each of the one or more images,
      prepares an initial population of individuals constituted by individuals each having a genotype in which orders between the plural nodes and cause and effect relationship have been stipulated, wherein a probability distribution of the plural nodes is expanded to a time sequential process,
      repeatedly performs processing for crossovers and/or mutations on the initial population of individuals based on a genetic algorithm,
      calculates an evaluated value of each of the individuals resulting from the crossovers and/or mutations based on the learning data,
      searches for an optimum individual from the individuals resulting from the crossovers and/or mutations, and
      selects a phenotype of the optimum individual as the network structure.

2. A learning apparatus as set forth in claim 1,
   wherein the genotype
      takes the plural nodes arranged in a first direction according to a stipulated order as parent nodes,
      takes the plural nodes arranged in a second direction perpendicular to the first direction according to the stipulated order as child nodes, and
      stipulates presence or absence of a cause and effect relationship between corresponding nodes by alleles in each gene locus at which each parent node and each child node correspond to each other.

3. A learning apparatus as set forth in claim 2, wherein genes at gene loci at which child nodes have orders equal to or higher than orders of parent nodes show no manifestation of traits.

4. A learning apparatus as set forth in claim 2,
   wherein when the number of parent nodes having a cause and effect relationship with an arbitrary child node exceeds a given number, the learning means inverts genes in at least one gene locus associated with the child node onto its allele such that the number of parent nodes having the cause and effect relationship with the child node becomes less than the given number.

5. A learning apparatus as set forth in claim 1, wherein the initial population of individuals reflects all or some of prior knowledge of a designer.

6. A learning apparatus as set forth in claim 1, wherein the initial population of individuals is based on individuals obtained as a result of learning.

7. A learning apparatus as set forth in claim 1,
   wherein a dynamic cause and effect relationship between plural nodes is represented by a directed graph, and
   wherein said Bayesian network includes an initial network in which a cause and effect relationship between plural nodes in the initial population of individuals is represented by a directed graph and a transition network in which a cause and effect relationship between plural nodes regarding from a population of individuals existing at instant of time (t-1) to a population of individuals existing at instant of time t is represented by a directed graph and in which a cause and effect relationship between plural nodes in the population of individuals at the instant of time t is represented by a directed graph.

8. A learning apparatus as set forth in claim 7, wherein all genes in gene loci between plural nodes regarding from the population of individuals existing at the instant of time (t-1) to the population of individuals existing at the instant of time t develop their traits.

9. A learning method of building, based on learning data and a time sequential process, a network structure of a dynamic Bayesian network for inferring behavior of a user, wherein in the network a cause and effect relationship between plural nodes is represented by a directed graph, the learning method comprising the steps of:
   capturing one or more images of the user on an image capturing device;
   recognizing one or more characteristics of the user based on one or more parameters including direction, position, size and motion of the user in one or more regions of each of the one or more images;
   preparing an initial population of individuals constituted by individuals each having a genotype in which orders between the plural nodes and cause and effect relationship have been stipulated, wherein a probability distribution of the plural nodes is expanded to a time sequential process;
   repeatedly performing processing for crossovers and/or mutations on the initial population of individuals based on a genetic algorithm;
   calculating an evaluated value of each of the individuals resulting from the crossovers and/or mutations based on the learning data;
   searching for an optimum individual from the individuals resulting from the crossovers and/or mutations; and
   selecting a phenotype of the optimum individual as the network structure.

10. A learning apparatus for building, based on learning data and a time sequential process, a network structure of a dynamic Bayesian network for inferring behavior of a user, wherein in the network a cause and effect relationship between plural nodes is represented by a directed graph, the learning apparatus comprising:

an image capturing device for observing the user, wherein the image capturing device captures one or more images of the user;

a storage portion in which the learning data is stored; and a learning portion operable to build the network structure based on the learning data;

wherein the learning portion recognizes one or more characteristics of the user based on one or more parameters including direction, position, size and motion of the user in one or more regions of each of the one or more images, prepares an initial population of individuals constituted by individuals each having a genotype in which orders between the plural nodes and cause and effect relationship have been stipulated, wherein a probability distribution of the plural nodes is expanded to a time sequential process, repeatedly performs processing for crossovers and/or mutations on the initial population of individuals based on a genetic algorithm, calculates an evaluated value of each of the individuals resulting from the crossovers and/or mutations based on the learning data, searches for an optimum individual from the individuals resulting from the crossovers and/or mutations, and selects a phenotype of the optimum individual as the network structure.

* * * * *

UNITED STATES PATENT AND TRADEMARK OFFICE
CERTIFICATE OF CORRECTION

PATENT NO. : 7,627,539 B2 Page 1 of 1
APPLICATION NO. : 11/787548
DATED : December 1, 2009
INVENTOR(S) : Tsutomu Sawada It is certified that error appears in the above-identified patent and that said Letters Patent is hereby corrected as shown below:

Title page Add

Item
--(30)   Foreign Application Priority Data

October 31, 2005   JP   2005-317031
April 19, 2006     JP   2006-116038
August 31, 2006    JP   2006-236199--

Signed and Sealed this

Fifth Day of January, 2010

David J. Kappos
*Director of the United States Patent and Trademark Office*